US010410050B2

(12) United States Patent
Itkowitz et al.

(10) Patent No.: US 10,410,050 B2
(45) Date of Patent: *Sep. 10, 2019

(54) METHOD AND SYSTEM OF HAND SEGMENTATION AND OVERLAY USING DEPTH DATA

(71) Applicant: Intuitive Surgical Operations, Inc., Sunnyvale, CA (US)

(72) Inventors: Brandon D. Itkowitz, San Jose, CA (US); Simon P. DiMaio, San Carlos, CA (US); Tao Zhao, Sunnyvale, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,358

(22) Filed: Nov. 29, 2017

(65) Prior Publication Data

US 2018/0082114 A1 Mar. 22, 2018

Related U.S. Application Data

(63) Continuation of application No. 12/780,557, filed on May 14, 2010, now Pat. No. 9,858,475.

(51) Int. Cl.
*G06K 9/00* (2006.01)
*G06T 19/00* (2011.01)

(52) U.S. Cl.
CPC ........ *G06K 9/00375* (2013.01); *G06T 19/006* (2013.01); *G06T 2207/20112* (2013.01)

(58) Field of Classification Search
CPC ............... G06K 9/00375; G06T 7/194; G06T 2207/20112; G06T 2207/20132; G06T 2207/20156; G06T 19/006
See application file for complete search history.

(56) References Cited

U.S. PATENT DOCUMENTS

| 6,424,885 | B1 | 7/2002 | Niemeyer et al. |
| 9,858,475 | B2 * | 1/2018 | Itkowitz ............. G06K 9/00375 |
| 2002/0049510 | A1 | 4/2002 | Oda et al. |
| 2004/0189675 | A1 | 9/2004 | Pretlove et al. |
| 2005/0231532 | A1 | 10/2005 | Suzuki et al. |
| 2006/0170652 | A1 | 8/2006 | Bannai et al. |

(Continued)

OTHER PUBLICATIONS

Coogan, Thomas et al., "Real Time Hand Gesture Recognition Including Hand Segmentation and Tracking," ISVC 2006, 2nd International Symposium on Visual Computing, Lake Tahoe, NV, Nov. 6-8, 2006, 10 pages, Dublin City University, Dublin, Ireland.

(Continued)

*Primary Examiner* — Jeffrey A Brier

(57) ABSTRACT

In a minimally invasive surgical system, a plurality of video images is acquired. Each image includes a hand pose image. Depth data for the hand pose image is also acquired or synthesized. The hand pose image is segmented from the image using the depth data. The segmented image is combined with an acquired surgical site image using the depth data. The combined image is displayed to a person at a surgeon's console of the minimally invasive surgical system. Processing each of the video images in the plurality video images in this way reproduces the hand gesture overlaid on the video of the surgical site in the display.

20 Claims, 19 Drawing Sheets

(56) References Cited

U.S. PATENT DOCUMENTS

| | | |
|---|---|---|
| 2007/0167702 A1 | 7/2007 | Hasser et al. |
| 2011/0102438 A1 | 5/2011 | Mathe et al. |
| 2011/0282141 A1 | 11/2011 | Itkowitz et al. |
| 2016/0110613 A1* | 4/2016 | Ghanem ............ G06K 9/00778 382/103 |

OTHER PUBLICATIONS

Crabb, Ryan et al., "Real-time Foreground Segmentation via Range and Color Imaging," Proceedings IEEE Conference on Computer Vision and Pattern Recognition, Workshop on Time of Flight Camera Based Computer Vision, 2008, 5 pages, CA, USA.

Finger, Jonathan et al., "Video Matting from Depth Maps," 2007, 5 pages, University of California Santa Cruz, Santa Cruz, CA, USA.

Garg, Pragati et al., "Vision Based Hand Gesture Recognition," World Academy of Science, Engineering and Technology, Jan. 2009, pp. 972-977, Issue 49.

Göktürk, Salih Burak et al., "3D Head Tracking Based on Recognition and Interpolation Using a Time-of-Flight Depth Sensor," 2004, 7 pages.

Guthrie, Bart, "Virtual Interactive Surgery," UAB Insight on Neurosciences: Neurology and Neurosurgery magazine, Spring 2010, vol. 2, No. 2, p. 6; published by UAB Health System, Birmingham, Alabama.

Kollorz E., et al., "Gesture Recognition with a Time-of-fight Camera," International Journal of Intelligent Systems Technologies and Applications, Inderscience Publishers, 2008, vol. 5 (3/4), pp. 334-343.

Lockton, Ray, "Hand Gesture Recognition Using Computer Vision," 4th Year Project Report, 2002, pp. 1-69, Oxford University, Oxford, UK.

Niebles, Juan Carlos et al., "A Hierarchical Model of Shape and Appearance for Human Action Classification," IEEE Conference on Computer Vision and Pattern Recognition, CVPR '07, Jun. 17-22, 2007, pp. 1-8, IEEE.

Segen, Jakub and Senthil Kumar, "Shadow Gestures: 3D Hand Pose Estimation using a Single Camera," IEEE Computer Society Conference on Computer Vision and Pattern Recognition, Jun. 1999, 7 pages, IEEE.

Sánchez-Nielsen, Elena et al., "Hand Gesture Recognition for Human-Machine Interaction," Journal of WSCG, Feb. 2-6, 2003, 8 pages, vol. 12, No. 1-3, Union Agency—Science Press, Plzen, Czech Republic.

Song, Cindy, et al., "Video Hand Gesture Interface," 2006, 22 pages, University of Berkeley, Berkeley, CA, USA.

Van Den Bergh M., et al., "Haarlet-based Hand Gesture Recognition for 3D Interaction," 2009 Workshop on Applications of Computer Vision (WACV), 2009, pp. 1-8.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

\* cited by examiner

METHOD AND SYSTEM OF HAND SEGMENTATION AND OVERLAY USING DEPTH DATA

RELATED APPLICATIONS

This application is a continuation of U.S. patent application Ser. No. 12/780,557 (filed 14 May 2010), which is incorporated herein by reference in its entirety.

BACKGROUND

Field of Invention

Aspects of this invention are related to endoscopic imaging, and are more particularly related to overlaying an image on a stereoscopic real-time video display for a surgeon.

Related Art

The da Vinci® Surgical System, manufactured by Intuitive Surgical, Inc., Sunnyvale, Calif., is a minimally invasive teleoperated surgical system that offers patients many benefits, such as reduced trauma to the body, faster recovery and shorter hospital stay. One key component of the da Vinci® Surgical System is a capability to provide two-channel (i.e., left and right) video capture and display of three-dimensional (3D) visible images that provides stereoscopic viewing for the surgeon.

Such electronic stereoscopic imaging systems may output high definition video images to the surgeon, and may allow features such as zoom to provide a "magnified" view that allows the surgeon to identify specific tissue types and characteristics, as well as to work with increased precision. However, techniques for instructing how to use a minimally invasive surgical system are generally restricted to oral communications.

Some prior work has looked at rendering three-dimensional visuals, such as ghost tools, to instruct a user how to operate slave instruments using a master manipulator in a minimally invasive surgical systems. While these methods are an improvement over oral communications alone, the methods do not provide the full expressiveness that can be obtained from natural and expressive gesturing by a human.

Some work has been reported that appears to use a constant color background to segment a video of a hand of a proctor and to display the segmented image in the field of view of a surgeon during normal open surgery. While this approach allows, for example, remote proctoring, the process is of questionable applicability for environments where use of a constant color background and/or open surgery are not practical.

SUMMARY

In one aspect, in a minimally invasive surgical system, an acquired video includes a plurality of video images that each includes a hand pose image. Each video image is paired with an image containing depth data from the same or a similar viewpoint. The hand pose image is segmented from the video image using the depth data. The hand pose image is combined with an acquired surgical site image. The combined image is displayed to a person at a surgeon's console of the minimally invasive surgical system. Processing each of the video images in the plurality video images in this way reproduces the hand gesture overlaid on the video of the surgical site in the display.

The hand gestures are used to instruct the person at the surgeon's console in minimally invasive surgery, e.g., where to grasp, cut or stitch, or to instruct that person how to manipulate the slave surgical instrument. Hand gestures communicate information more clearly and easily than can be done with oral communications alone.

In another aspect, an acquired video sequence includes a plurality of video images that each includes images of the surgeon's hand(s) and a master manipulator. In one example, both depth data and the plurality of video images are acquired, and in another example include only the plurality of video images are acquired. In both examples, the images of the surgeon's hand(s) and the master manipulator are segmented from the video image. The segmented images of the surgeon's hand(s) and the master manipulators are combined with an acquired surgical site image. The combined image is displayed to the person at the surgeon's console so that the console functions as a see-through console, i.e., it appears to the person that the person is looking through a transparent console and viewing the person's hands at the same time that the image of the surgical site is viewed.

Thus, in the first aspect, a video image including a hand pose image of a hand gesture made by a second person is acquired. Depth data is also acquired, but in some aspects, the depth data is synthesized. The hand pose image is segmented from the video image. The segmented hand pose image is combined in real-time with an acquired image of a surgical site to obtain a combined image of the hand pose image and the image of the surgical site. In one aspect, an alpha mask, which was generated using depth data, is used to perform the combination. The combined image is displayed to a first person, different from the second person. The first person is at a console of a minimally invasive surgical system.

Each video image in a sequence of video images is processed in this same way. The resulting sequence of combined images presents an expressive hand gesture to the second person superimposed over the real-time video of the surgical site. The hand gesture includes the full expressiveness that can be obtained from natural and expressive gesturing by a human.

In one aspect, the hand gesture includes a hand gesture instructing the second person in minimally invasive surgery. In another aspect, the hand gesture instructs the second person how to manipulate a slave surgical instrument in the minimally invasive surgical system.

In one aspect, the method also includes transforming the segmented hand pose image after the segmenting and prior to the combining. The transformation is, for example, a perspective transformation.

In one aspect, the segmenting process eliminates data from the video image having a depth greater than a maximum depth threshold to obtain a first modified data frame. Next, based on the depth data, pixels in the first modified data frame not representing the hand pose are eliminated to obtain a hand pose mask of the hand pose. Then, the hand pose image is extracted from the video image using the hand pose mask.

In one aspect, the elimination of pixels not representing the hand pose utilizes the depth data in a plurality of flood fills to identify pixels representing the hand pose. Any pixels remaining after the plurality of flood fills and not representing the hand pose are eliminated to generate the hand pose mask of the hand pose.

In one aspect, the elimination of pixels not representing the hand pose utilizes, in addition to the depth data, a color classifier to identify pixels not in the hand pose image. For example, a skin color classifier is used to refine a boundary of the hand pose mask.

In another aspect, the elimination utilizes information characterizing the master manipulator. This information is different from camera captured depth data. The information is, for example, a static image of the master manipulator, or synthesized depth data based on the kinematic data and geometry of the master manipulator.

In still yet another aspect of this method, the second person is at another console of the minimally invasive surgical system and the console includes a master manipulator. The master manipulator is parked to provide an unobstructed volume in which to make the hand gesture. Alternatively, the console does not include a master manipulator.

A minimally invasive surgical system includes a surgeon's console. The surgeon's console includes a first viewer. A display image controller is configured to receive an acquired image of a surgical site; is configured to receive an acquired video image including a hand pose image; and is connected to the first viewer.

The display image controller combines the hand pose image with the surgical site image using an alpha mask. The alpha mask is generated using depth data of the hand pose image. The display image controller sends the combined image to the first viewer to be displayed.

The minimally invasive surgical system also includes a second surgeon's console. The second surgeon's console includes a second viewer, and a depth sensing camera mounted on the second viewer. The depth sensing camera is connected to the display image controller. The depth sensing camera acquires the video image including the hand pose image, and generates the depth data. The hand pose image is part of a hand gesture made by a user of the second surgeon's console.

In the see-through console aspect, a video image including a user's hand image and a master manipulator image is acquired. The master manipulator is part of a minimally invasive surgical system, and is mounted on a console having a viewer. The user, when looking into the viewer to view an image of a surgical site during a conventional mode of operation, can see neither the master manipulator nor the user's hand.

The hand and master manipulator images are segmented from the video image. The segmented hand and master manipulator images are combined in real time with an image of a surgical site to obtain a combined image of the hand and master manipulator images and the image of the surgical site. The combined image is displayed in the viewer so that the user sees both the hand image and the master manipulator image overlaid on the surgical site image. Thus, it appears to the user that the user can see through the console.

In one aspect the combination of the images is done using an alpha mask. The alpha mask is generated using depth data. In one aspect, the depth data is acquired depth data and in another aspect is synthesized depth data.

In one aspect of the see-through console, depth data is acquired and used in the segmenting process. In one aspect, the segmenting generates a hand and console mask. The hand and master manipulator images are extracted from the video image using the hand and console mask. The hand and console mask is generated using acquired depth data in one aspect, and synthesized depth data in another. The depth data is synthesized using a hand depth calibration procedure. Other depth data is synthesized using the kinematic and geometric data for the master manipulators.

In this aspect, a minimally invasive surgical system includes a console. The console includes a viewer. A user looking into the viewer sees a displayed image of a surgical site. The console also includes a master manipulator. The user, while looking into the viewer during a conventional mode of operation, can see neither the user's hands nor the master manipulator.

The system also includes a display image controller configured to receive an acquired image of the surgical site. The display image controller is also configured to receive an acquired video image including an image of the user's hand and an image of the master manipulator. The display image controller is connected to the viewer.

The display image controller extracts the images of the user's hand and the master manipulator from the video image. The display image controller then combines the images of the user's hand and the master manipulator with the surgical site image and sends the combined image to the viewer to be displayed. The display of the combined image on the viewer makes the console function as a see-through console.

In one aspect of the see-through console, the console also includes a depth sensing camera mounted on the viewer. The depth sensing camera is connected to the display image controller. The depth sensing camera acquires the video image including images of the user's hand and the master manipulator. The acquired video image includes depth data.

In another aspect of the see-through console, the console includes a camera mounted on the viewer. The camera is connected to the display image controller. The camera acquires the video image including images of the user's hand and the master manipulator.

Figure 1A:
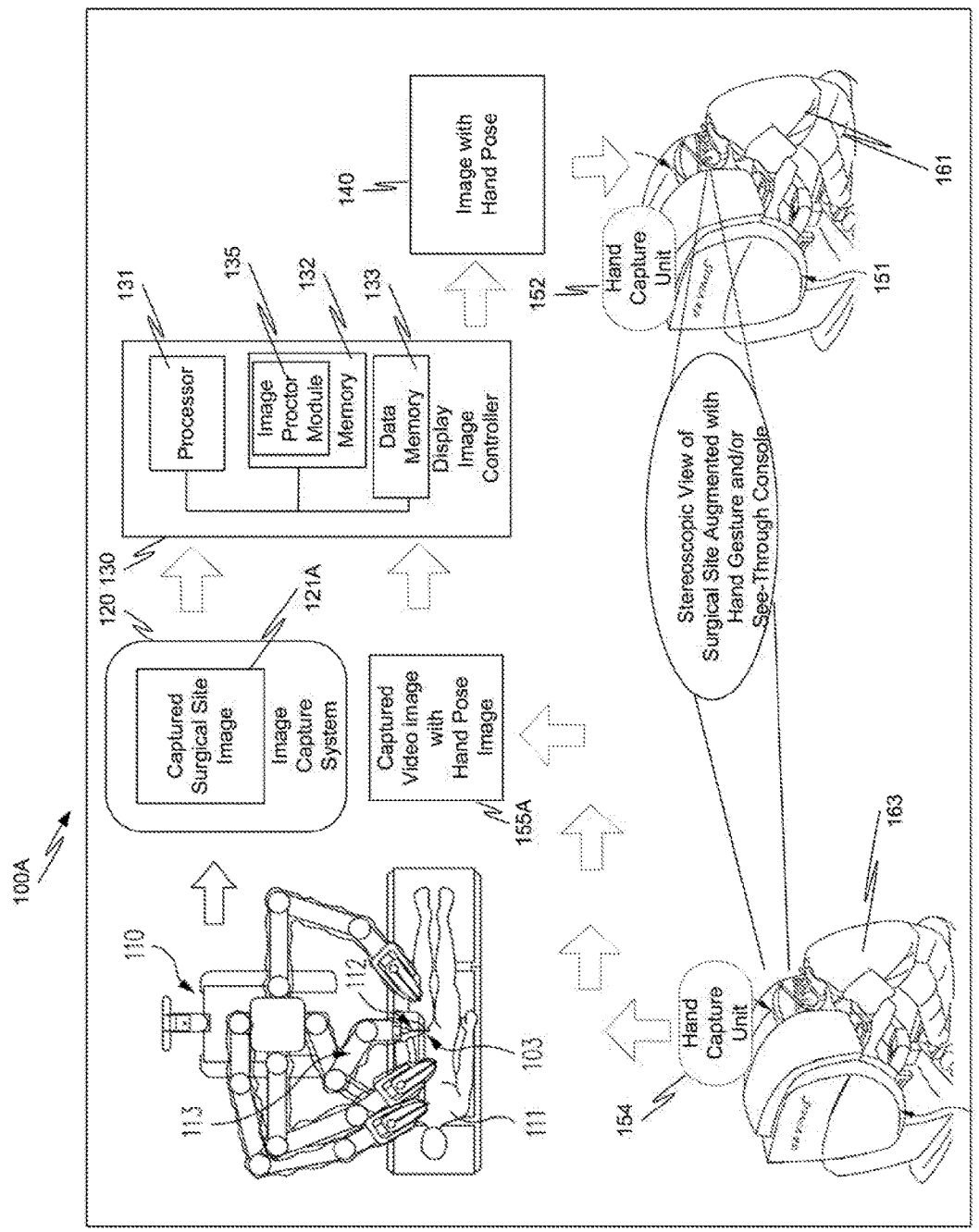
FIG. 1A is a high level diagrammatic view of a minimally invasive teleoperated surgical system including two surgeon's consoles, and configured to support an augmented surgeon's console display with either or both of (i) a hand gesture image, and (ii) a user's hand image and a master manipulator image.

In the drawings, the first digit of a reference number indicates the figure in which the element with that reference number first appeared.

DETAILED DESCRIPTION

Aspects of this invention augment the proctoring capability of minimally invasive surgical systems, e.g., the da Vinci® minimally invasive teleoperated surgical system manufactured by Intuitive Surgical, Inc. of Sunnyvale, Calif., by displaying real-time hand gestures overlaid on a surgical site image viewed by a surgeon. (da Vinci® is a registered trademark of Intuitive Surgical, Inc. of Sunnyvale, Calif.). Other aspects include a see-through console capability that augments the display viewed by a surgeon. The augmented display includes an image of the surgeon's hand or hands and any master manipulators used by the surgeon overlaid on an image of the surgical site so that the surgeon appears to be seeing through the console. The surgeon does not have to look away from the console viewer to see the locations of the master manipulators.

While a minimally invasive teleoperated surgical system is used below as an example, the proctoring capability and the see-through console capability can be used in any minimally invasive surgical system that includes: a master manipulator to control a slave surgical device; a camera to acquire an image of the surgical site including the slave surgical device; and a device to display the image of the surgical site.

In the hand-proctoring aspects, a depth sensing camera is mounted to capture a video of a hand gesture made by a person different from the person controlling the slave surgical instrument. Typically, the person making the gesture is at a second console that has a configuration similar to the first console that includes the master manipulator and the display.

The acquired video includes a plurality of video images that each includes a hand pose image. Each video image includes depth data. As explained more completely, below, for each of the video images, the hand pose image is segmented from the video image using the depth data. The segmented hand pose image is combined with the surgical site image. The combined image is displayed to the person at the first console. Processing each of the video images in the plurality in this way reproduces the hand gesture overlaid on the video of the surgical site in the display.

The hand gestures are used to instruct the person at the first console in minimally invasive surgery, e.g., where to grasp, cut or stitch, or to instruct that person how to manipulate the slave surgical instrument. Hand gestures communicate information more clearly and easily than can be done with oral communications alone.

In the see-through console aspects, in one aspect, a depth sensing camera is mounted to capture a video of the surgeon's hand(s), and of the master manipulators. Alternatively, a color camera is mounted to capture the video of the surgeon's hand(s) and of the master manipulator(s). In both examples, the acquired video includes a plurality of video images that each includes an image of the surgeon's hand(s) and an image of the master manipulator(s). As explained more completely below, the image of the surgeon's hand(s) and the master manipulator(s) are segmented from the video image. The segmented images of the surgeon's hand(s) and the master manipulator(s) are combined with the surgical site image. The combined image is displayed to the person controlling the slave surgical instrument so that the console functions as a see-through console.

Figure 1B:
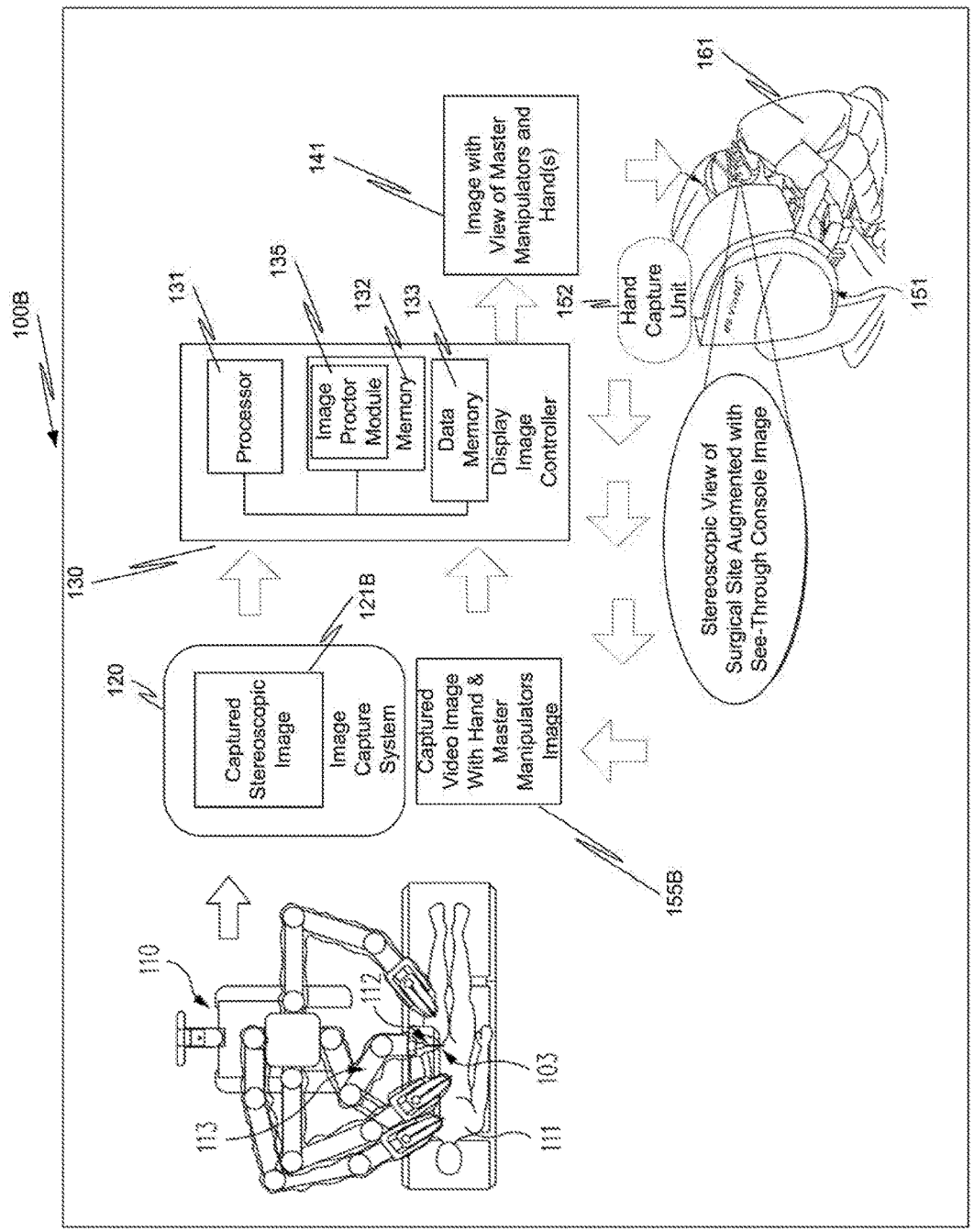
FIG. 1B is a high level diagrammatic view of a minimally invasive teleoperated surgical system including a surgeon's console, and configured to support an augmented surgeon's console display with either or both of (i) a hand gesture image, and (ii) a user's hand image and a master manipulator image.

FIGS. 1A and 1B are high level diagrammatic views of a minimally invasive teleoperated surgical system 100A, 100B, for example, the da Vinci® Surgical System, including an augmented display image controller and a modified surgeon's console including a hand capture unit. There are other parts, cables etc. associated with the da Vinci® Surgical System, but these are not illustrated in FIGS. 1A and 1B to avoid detracting from the disclosure.

In this example, system 100A, 100B includes a cart 110 with a plurality of manipulators. Each manipulator can be coupled to, and decoupled from master tool manipulators on surgeon's consoles 151, 153. One of surgeons 161, 163 moves a master tool manipulator and in response one of the manipulators moves a slave surgical device. Each master tool manipulator includes a master grip (See FIG. 3). A master tool manipulator is an example of the master manipulator referred to above.

A stereoscopic endoscope mounted on manipulator 113 provides an image of surgical site 103 within patient 111. The image includes images of any of the slave surgical devices in the field of view of stereoscopic endoscope 112. The interactions between the master tool manipulators, the slave surgical devices and stereoscopic endoscope 112 are the same as in a conventional system and so are known to those knowledgeable in the field.

In one aspect, during minimally invasive surgery, a proctoring surgeon 163 (FIG. 1A), at a second surgeon's console 153, utilizes natural hand gestures in communicating to another surgeon 161 at a first surgeon's console 151. A hand capture system 154, mounted in surgeon's console 153, acquires a video sequence that includes a plurality of video images that each includes a hand pose image. As explained more completely below, hand capture unit 154 includes a depth sensing camera, in one aspect. The depth sensing camera, e.g., a time-of-flight camera, captures the sequence of video frames of the proctoring surgeon's hand or hands.

The use of surgeon's console 153 is illustrative only. In view of the following description, the hand gesture can be captured in a configuration that does not include the master tool manipulators of console 153, for example.

Each captured video frame 155A (FIG. 1A) includes a hand pose image. Captured video frame 155A, in one aspect, includes a depth value and a color for each pixel in the image. Sometimes herein, captured video frame 155A is referred as a captured video image 155A.

As explained more completely below, the depth values improve the robustness of hand pose image segmentation compared to a solid color background as in chroma key segmentation, static background subtraction segmentation, or skin appearance models. The depth values also provide three-dimensional information about objects in the image, which can be used for perspective transformations.

A conventional stereoscopic image 121A of surgical site 103 is captured by an image capture system 120, e.g., a camera. Captured surgical site image 121A and captured video image with hand pose image 155A are received by a display image controller 130.

Using the depth data, display image controller 130 segments the hand pose image from captured video image 155A. The segmented hand pose image is combined with normal stereoscopic image 121A to create an image with hand pose 140. Composite image 140, sometimes referred to as the combined image, is sent to at least surgeon's console 151 for display, in one aspect.

The use of the display in the viewer of the surgeon's console is also illustrative. Composite image 140 can also be displayed on an assistant's display (not shown) in system 100A so that the display can be viewed by an assistant, student, or observer. Further, composite image 140 could be recorded and displayed at a later time on an appropriate display device.

The composite image is viewed in real-time for each video image in the video sequence. Thus, the hand gesture is seen is real-time in the display.

This method of overlay allows proctoring surgeon 163 to be maximally expressive with her/his hands while using an intuitive interface that collocates her/his hand gestures with the surgical image. Proctoring with this system streamlines instruction and reduces miscommunication compared to oral instruction alone.

Figure 2A:
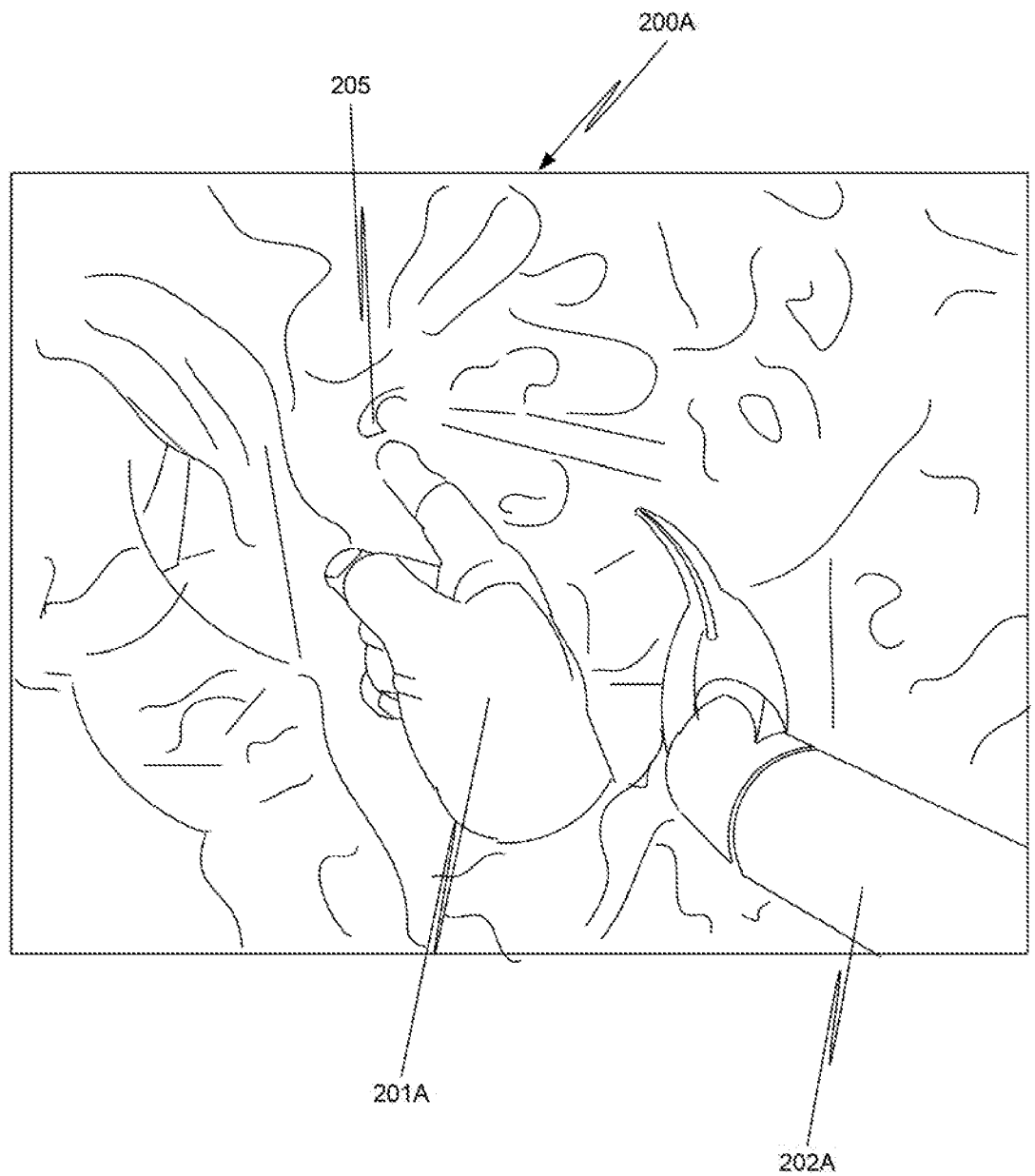
FIGS. 2A to 2F are examples of various display modes available on the surgeon's consoles of FIGS. 1A and 1B.

The proctoring surgeon effectively regains many of the benefits of teaching in an open surgery setting by being able to point at anatomy directly even though surgical site 103 is not directly visible. For example, in combined image 200A (FIG. 2A), hand image 201A of proctoring surgeon 163 is pointing at tissue 205 to be removed using slave surgical instrument 202A. The background in display image 200A is a three-dimensional color image of a surgical site and a teleoperated slave surgical instrument from stereoscopic endoscope 112 that is within patient 111.

Hand image 201A has been segmented from the video sequence captured at console 153 and is displayed as a three-dimensional color object superimposed on the background image of the surgical site. A hand gesture is a good way to convey intent.

Figure 2B:
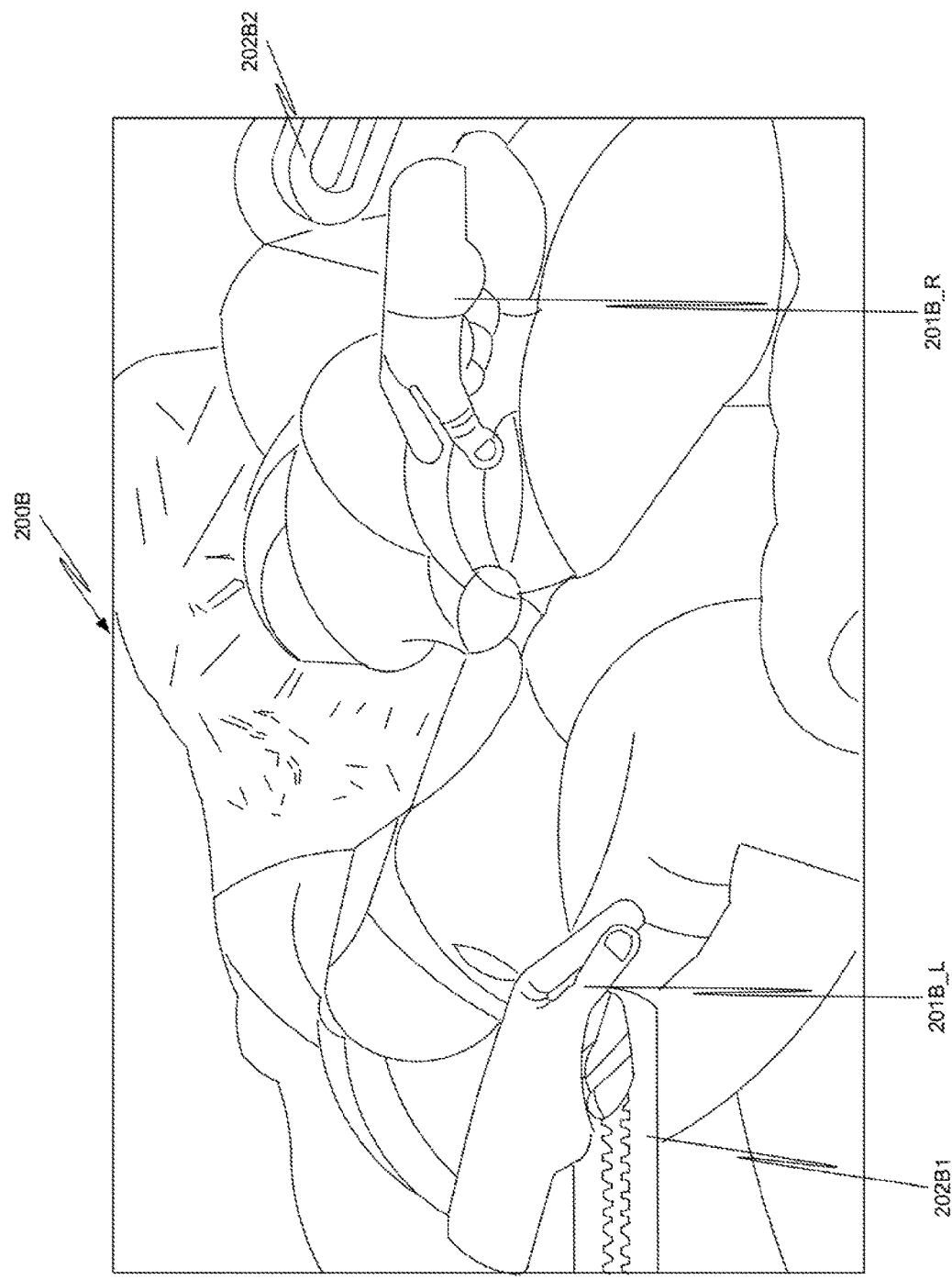

Also, proctoring surgeon 163 can use the left or right hand to convey handedness to console surgeon 161 without needing to continually indicate orally which hand to use. For example, in combined image 200B (FIG. 2B), three-dimensional color images of right hand 201B_R and left hand 201B_L are used to convey information about using slave surgical instruments 202B1 and 202B2, respectively to console surgeon 161.

There are a multitude of tasks in minimally invasive surgery that can be effectively communicated using hand gestures alone, such as where to grasp, which direction to move, how to orient the slave surgical instrument, how to manipulate the slave surgical instrument wrist, where to dissect, etc. In essence, proctoring surgeon 163 can use general oral descriptive language relating to the procedure while relying on the hand visual to show specific physical intent.

Figure 2C:
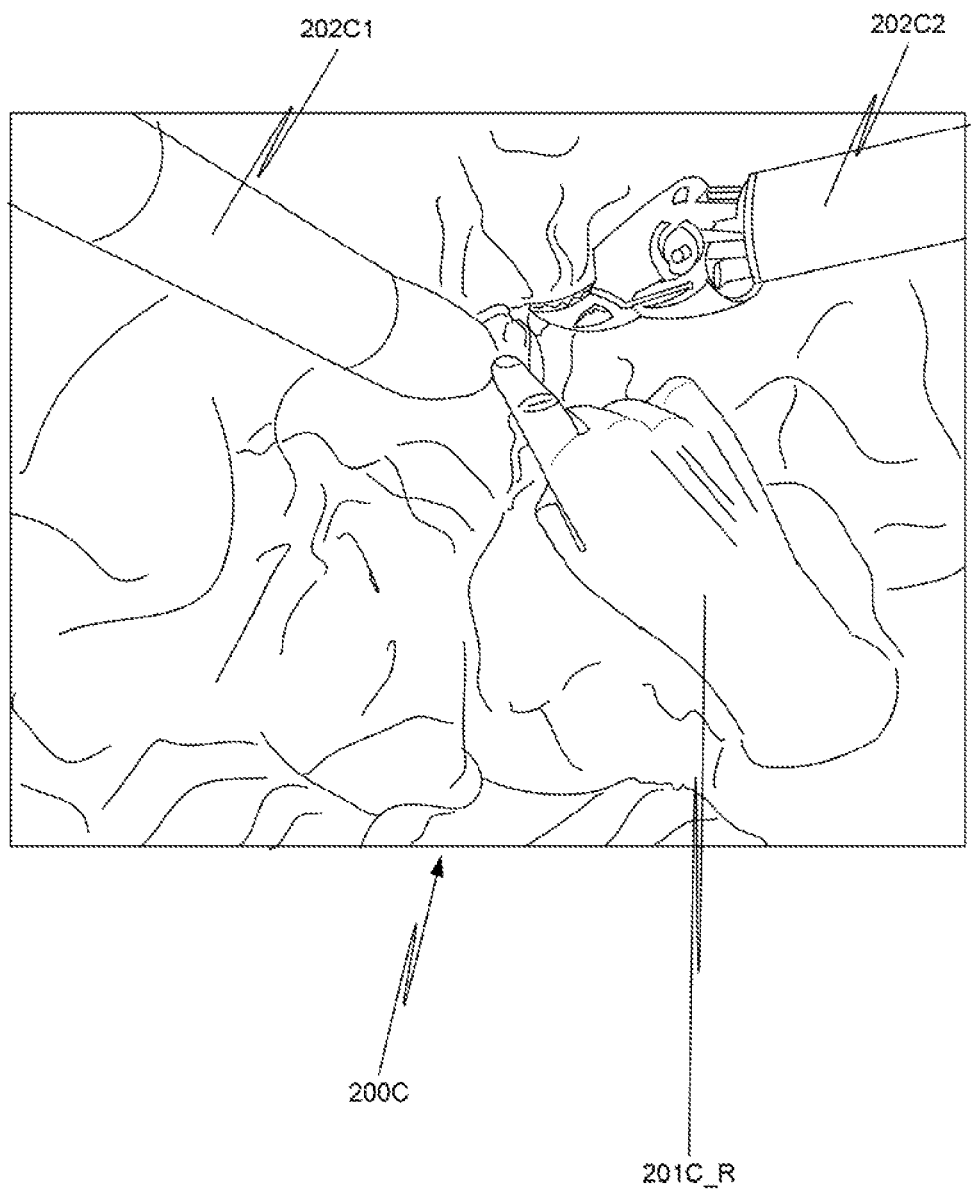

Combined image 200C (FIG. 2C) is another example of a combined three-dimensional color visual display. Combined image 200C includes a three-dimensional color background image of the surgical site including images of two teleoperated slave surgical instruments 202C1, 202C2, and a three-dimensional color image 202C_R of the right hand of proctoring surgeon 163 pointing to a feature in the surgical field.

Proctoring surgeon 163 does not have to touch or put anything on her/his hands to communicate to console surgeon 161. Proctoring surgeon 163 simply moves a hand or hands about in the space below the bottom of the viewing console, sometimes caller a viewer, and above the top of the master grips of the master tool manipulators. Proctoring surgeon 163 could even hold a surgical tool to aid in instruction. Surgeon's console 153 can be located in or out of the sterile field and even at a location remote from the operating theater.

In another aspect, the video from hand capture unit 152 (FIG. 1B) on surgeon's console 151 can be used to provide other capabilities. For example, when surgeon 161 is looking into the three-dimensional viewer of console 151, surgeon 161 cannot see either his hands or the master grips of the master tool manipulators. Thus, if surgeon 161 removes his hands from the master grips for any reason, e.g., to make a hand gesture or interact with a user interface, surgeon 161 must look away from the viewer for the locations of the master grips.

With the data from hand capture unit 152, console 151 is effectively made transparent so that surgeon can see both his hands and the master grips in the display of the three-dimensional viewer. In one aspect, hand capture unit 152 provides both color and depth data, and in another aspect, hand capture unit 152 provides only color data.

Irrespective of the implementation of hand capture unit 152, an image of the master grips and the hands of surgeon 151 are segmented from captured video image 155B (FIG. 1B) by display image controller 130. The segmented three-dimensional images of the master grips and the hands are superimposed on the background three-dimensional image of surgical site 103 by display image controller 130, and sent as image 141 to console 151 for display.

For example, display image 200D (FIG. 2D) includes a three-dimensional background image of a surgical site that includes teleoperated slave surgical instruments 202D1 and 202D2. Superimposed on the three dimensional background image is a three-dimensional image of master grip 291_L of master tool manipulator 290_L, master grip 291_R of master tool manipulator 290_L, and right hand 290_R of surgeon 161. Thus, surgeon 161 can see the surgical site, master grips 291_L, 291_R and his hands. When a surgeon can see master grips 291_L, 291_R in the displayed image, the surgeon's console functions as a see-through console.

As surgeon 161 moves his hands relative to master grips 291_L, 291_R, he can see the motion in the display. Surgeon 161 can position his hands on master grips 291_L, 291_R without removing his head from the viewer and looking for master grips 291_L. 291_R.

Figure 2D:
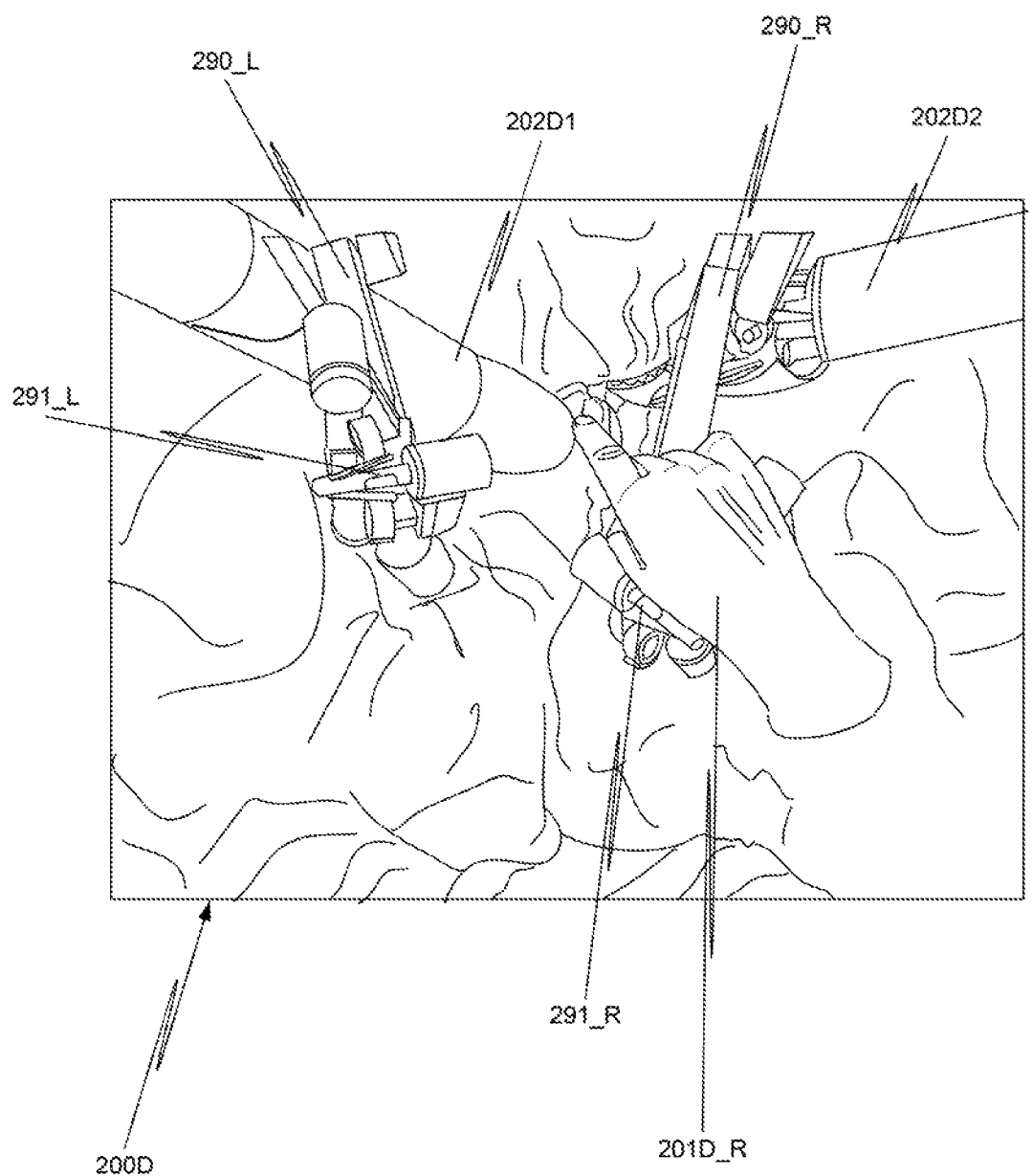

In FIG. 2D, the image of master grips 291_L, 291_R and right hand 290_R is opaque. This illustrative only and is not intended to be limiting. The image can be transparent or semi-transparent. Also, the image of the master grips can have an opacity that is different from the opacity of the hand or hands, in one aspect.

Figure 2E:
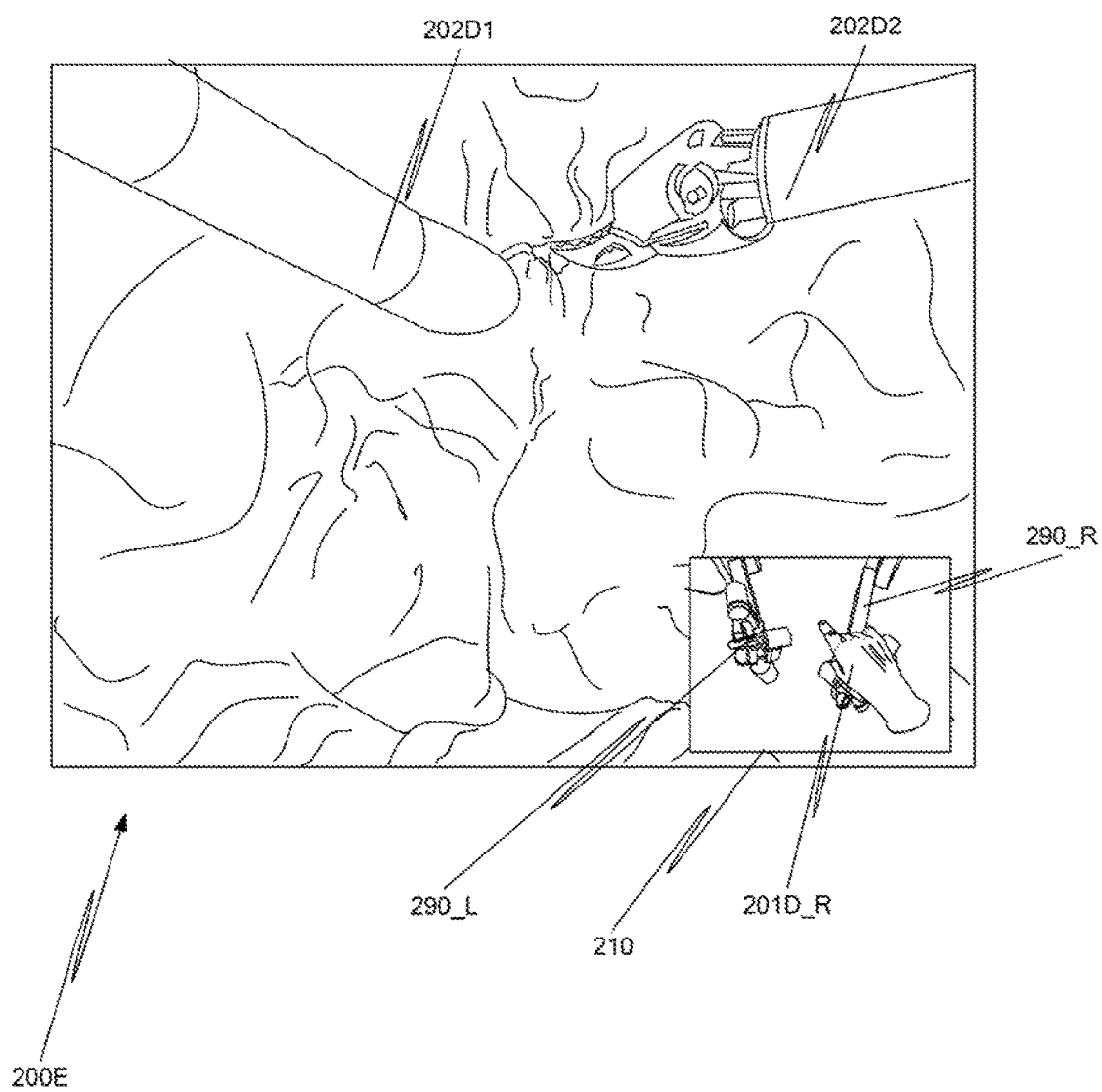

Further, the image of master grips 291_L, 291_R and the hands can be combined with the image of the surgical site in different ways. In another aspect, the image of master grips 291_L, 291_R and the hands is displayed as a picture within a picture, i.e., in a small picture 210 within display 200E (FIG. 2E) of the surgical site.

Figure 2F:
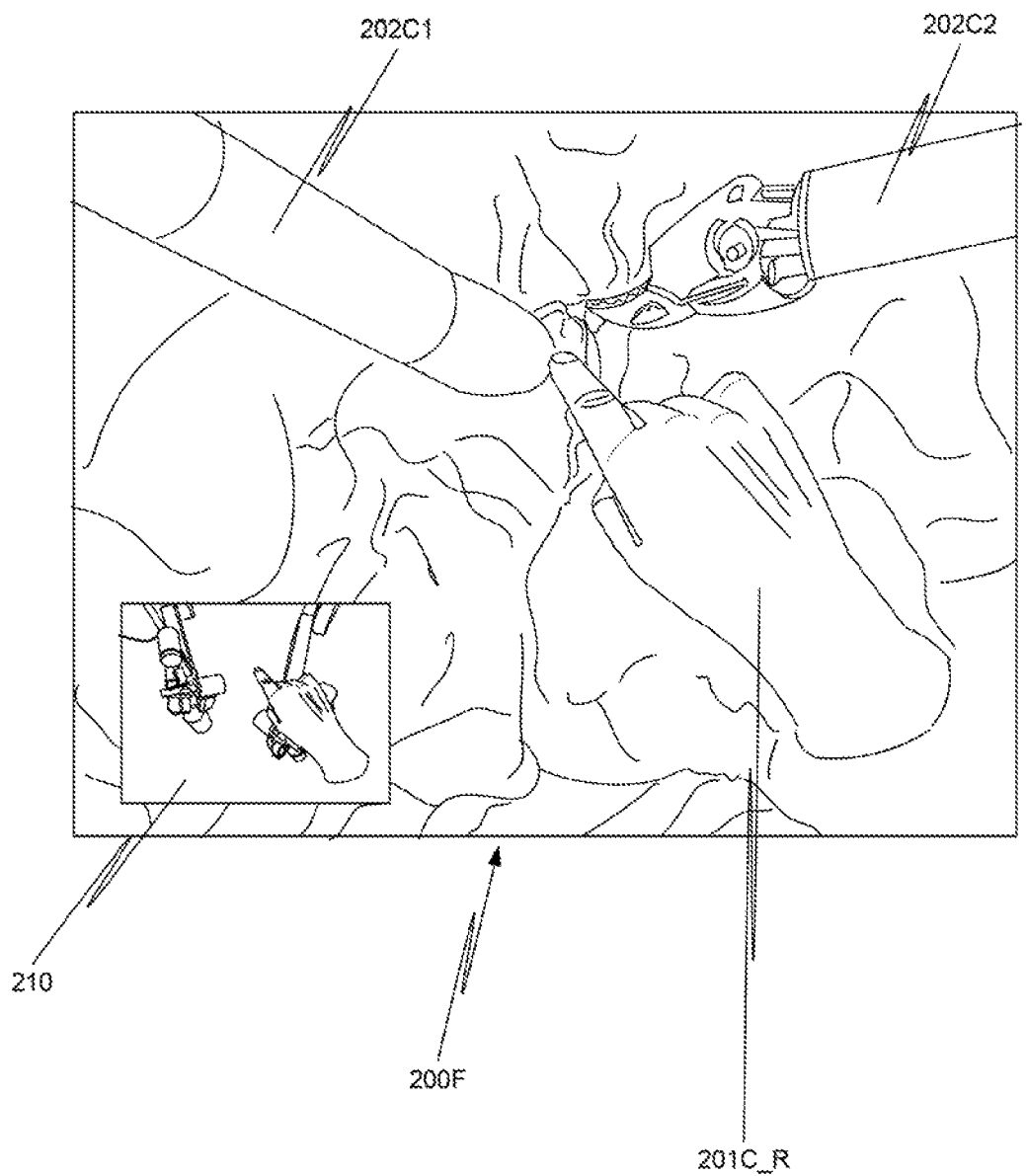

Various combination of the use of the see-through console and hand gesture proctoring are possible. For example, in combined image 200F (FIG. 2F), picture within a picture 210 is superimposed on combined image 200C (FIG. 2C) in the display. Returning to FIG. 1A, combined image 200C could be presented to console surgeon 161, while either combined image 200D or combined image 200F is presented to proctoring surgeon 163.

In FIGS. 2A to 2F, the images in these figures represent a snapshot at one point time of the displayed image sequence. The frames in the acquired video sequence are processed as described herein so that motion viewed by the surgeon in the display replicates the physical motion.

In FIGS. 2A to 2F, the images of the hand or hands displayed over the background surgical site image are opaque and displayed in color. This is illustrative only and is not intended to be limiting. The hand images, in one aspect, are semitransparent. In another aspect, the natural color is not used and instead, the hand images are displayed in a single color, e.g., green. In yet another aspect, only the outline of the hands is displayed. The particular color format of the hand image in the displayed image can be based upon the medical procedure being performed, surgeon preference, etc.

Prior to considering the various processes described above in further detail, one example of a surgeon's console 351 (FIG. 3) is considered. Surgeon's console 351 is an example of surgeon's consoles 151, 153. Surgeon's console 351 includes hand capture unit 352, a three-dimensional viewer 310, sometimes referred to as viewer 310, master manipulators 390_L, 390_R with master grips 391_L, 391_R, and a base 320.

Master grips 391_L, 391_R of master tool manipulators 390_L, 390_R are held by surgeon 361 using his forefinger and thumb, so that targeting and grasping involves intuitive pointing and pinching motions. Master tool manipulators 390_L, 390_R in combination with master grips 391_L, 391_R are used to control teleoperated slave surgical instruments, teleoperated endoscopes etc. in the same manner as conventional master tool manipulators in a conventional minimally invasive teleoperated surgical system. Also, the position coordinates of master tool manipulators 390_L, 390_R are known from the kinematics used in controlling the slave surgical instruments.

When the augmented hand gesture image capability and/or the see-through console capability described herein are not being used, three-dimensional viewer 310 works in the same way as a conventional three-dimensional viewer in the conventional minimally invasive teleoperated surgical system. Specifically, viewer 310 displays three-dimensional images of surgical site 103, in a patient 111, from stereoscopic endoscope 112 mounted on manipulator 113 until the system is changed to the hand proctor mode of operation, the see-through console mode of operation, or both.

Viewer 310 is positioned on console 351 (FIG. 3) near the surgeon's hands so that the image of the surgical site seen in viewer 310 is oriented so that surgeon 361 feels that he is actually looking directly down onto surgical site 103. The surgical instruments in the image appear to be located substantially where the surgeon's hands are located and oriented substantially as surgeon 361 would expect based on the position of his hands. However, as noted above, in the conventional mode of operation, surgeon 361 can see neither his hands, nor the position or orientation of master grips 391_L, 391_R, while viewing the displayed image of the surgical site in viewer 310.

In one aspect, master tool manipulators 390_L, 390_R are moved from directly in front of surgeon 361 and under viewer 310 so that they are positioned over base 320 and are no longer positioned under viewer 310, i.e., the master tool manipulators are parked out of the way of the hand gesture. This provides an unobstructed volume under viewer 310 in which surgeon 361 can make hand gestures.

Figure 3:
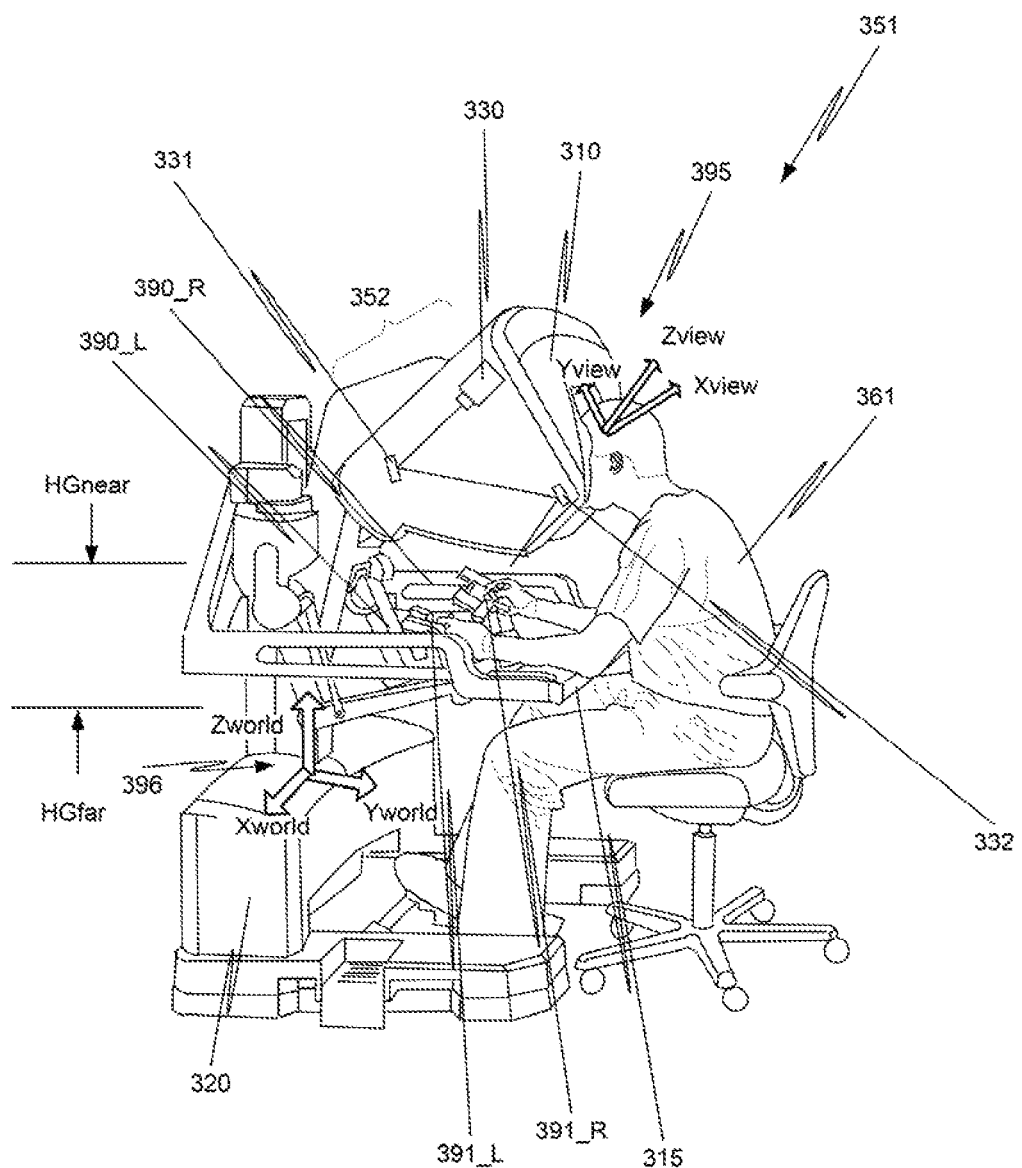
FIG. 3 is a more detailed illustration of one example of a surgeon's console.

In the aspect of FIG. 3, two coordinate systems are defined with respect to surgeon's console 351, a view coordinate system 395 and a world coordinate system 396. In view coordinate system 395, surgeon 361 is looking down Z-axis Zview. X-axis Xview extends from left to right in the display, while Y-axis Yview extends up and down in the display. In world coordinate system 396, Z-axis Zworld is a vertical axis. World X-axis Xworld and world Y-axis Yworld are in a plane perpendicular to Z-axis Zworld.

Hand capture unit 352, in one aspect, includes a depth sensing camera 330, sometimes referred to as camera 330, and a plurality of mirrors 331, 332. In the following examples, a time-of-flight camera is used as an example of depth sensing camera 330. Time-of-flight cameras are commercially available from Canesta, Inc. Americas Headquarters, Sunnyvale, Calif., USA, and Optrima NV of Brussels, Belgium. In another aspect for the see-through console mode of operation, camera 330 is a color camera that does not include time-of-flight capability.

Typically, a time-of-flight camera includes a near-infrared (NIR) pulse illumination source and an image sensor. Based on the known speed of light, the illumination pulses are coordinated with gating of the image sensor and the capturing of reflected signals. Reflections captured while the illumination pulse is active are closer to the camera than reflections captured when the illumination pulse is inactive. The data captured for each pixel by camera 330 includes a depth for that pixel.

Several factors are considered in mounting camera 330 in viewer 310. Camera 330 is mounted to achieve the minimum working distance of the camera, and to achieve viewing extents that are consistent with viewer 310. The viewpoint of camera 330 is aligned underneath the eyepieces of viewer 310 and aligned with view coordinate system 395. However, it is not necessary that camera 330 be physically mounted underneath the eyepieces. The optical path of camera 330 is redirected, using conventional techniques, with mirrors 331, 332 in this aspect. The optical path length also can be adjusted using positive or negative diopter lenses.

If mounting stereo time-of-flight cameras, the optical path for the stereo cameras is designed to satisfy the idealized stereo imaging geometry used for both viewer 310 and stereoscopic endoscopic 112, while also fitting within the form factor of viewer 310. Also, in one aspect each camera is configured to sense a unique set of wavelengths in the NIR spectrum. Alternatively, or in conjunction, the NIR spectrum emitted by each camera can be controlled. This allows each camera to sense only depth information associated with the NIR source for that camera. Alternatively, the two time-of-flight cameras could acquire data in an alternating fashion, e.g., the cameras could be time multiplexed.

The use of a depth sensing camera is also illustrative. Other depth sensing technologies could be use in conjunction with color cameras in view of the following description. The combination of a depth sensing technology and color cameras is effectively a depth sensing camera. Other techniques to capture depth information include stereo reconstruction, time-of-flight optical/electromagnetic tracking, time-of-flight acoustic tracking, etc.

As used herein, acquired depth data is depth data that is obtained using a depth sensing technology, e.g., a depth sensing camera. Synthesized depth data is depth data generated, for example, using a calibration procedure, and/or using data maintained by the minimally invasive surgical system, e.g., geometric and kinematic data for master tool manipulators.

Figure 4:
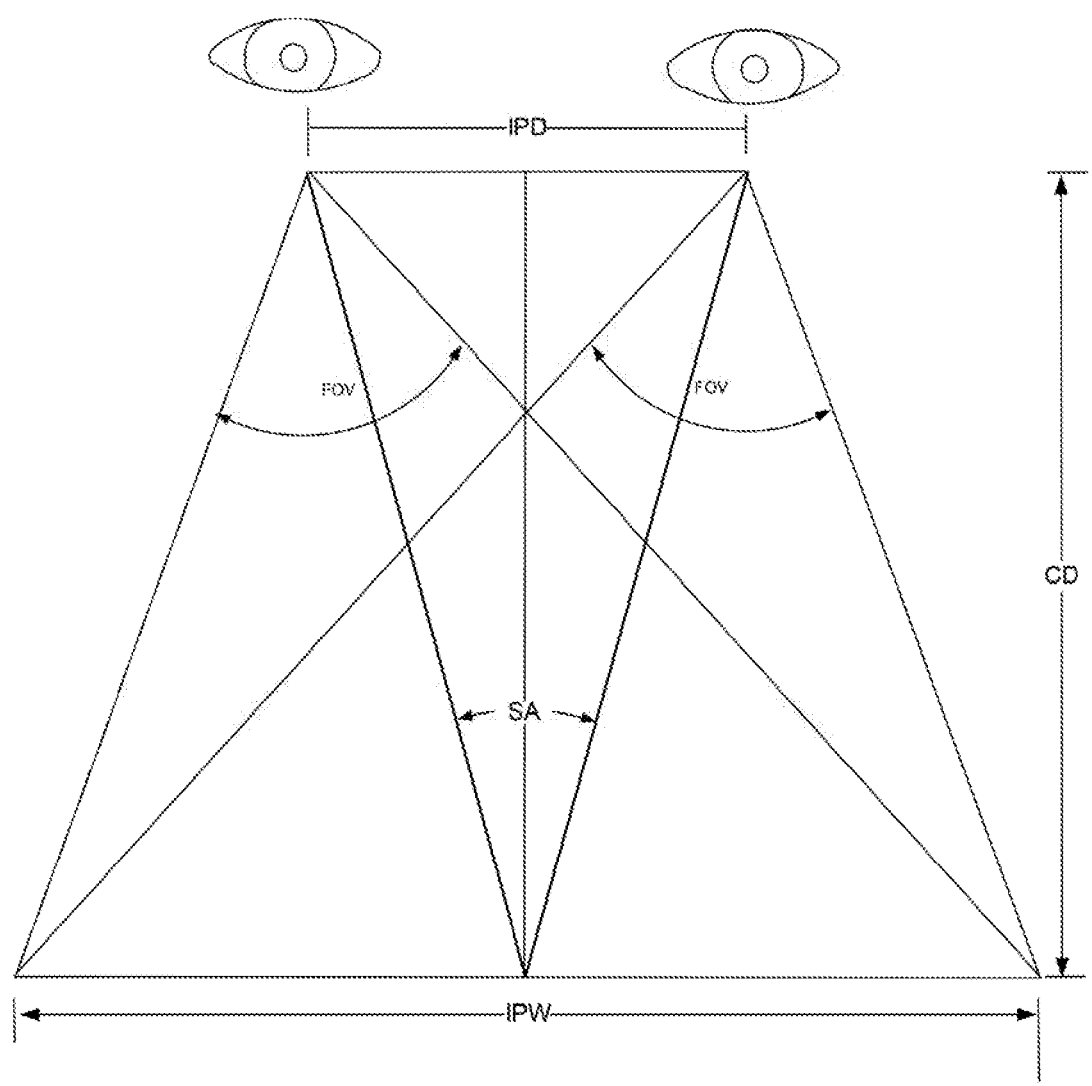
FIG. 4 is an illustration of the idealized stereo imaging geometry used.

FIG. 4 is an illustration of the idealized stereo imaging geometry used in mounting the stereo depth or color cameras. The two eyes at the top of FIG. 4 represent the depth sensing cameras, the color cameras, and the surgeon's eyes with respect to viewer 310. In addition, the stereo endoscopic cameras also use proportionally similar geometry. Table 1 presents dimensions associated with the reference characters used in FIG. 4 in one aspect.

TABLE 1

| Name | FIG. 4 Reference Character | | |
|---|---|---|---|
| Inter-Pupillary Distance | IPD | 63.5 | mm |
| Field of View | FOV | 42 | degrees |
| Convergence Distance | CD | 457 | mm |
| Stereo Angle | SA | 8 | degrees |
| Image Plane Width | IPW | 377 | mm |

Figure 5:
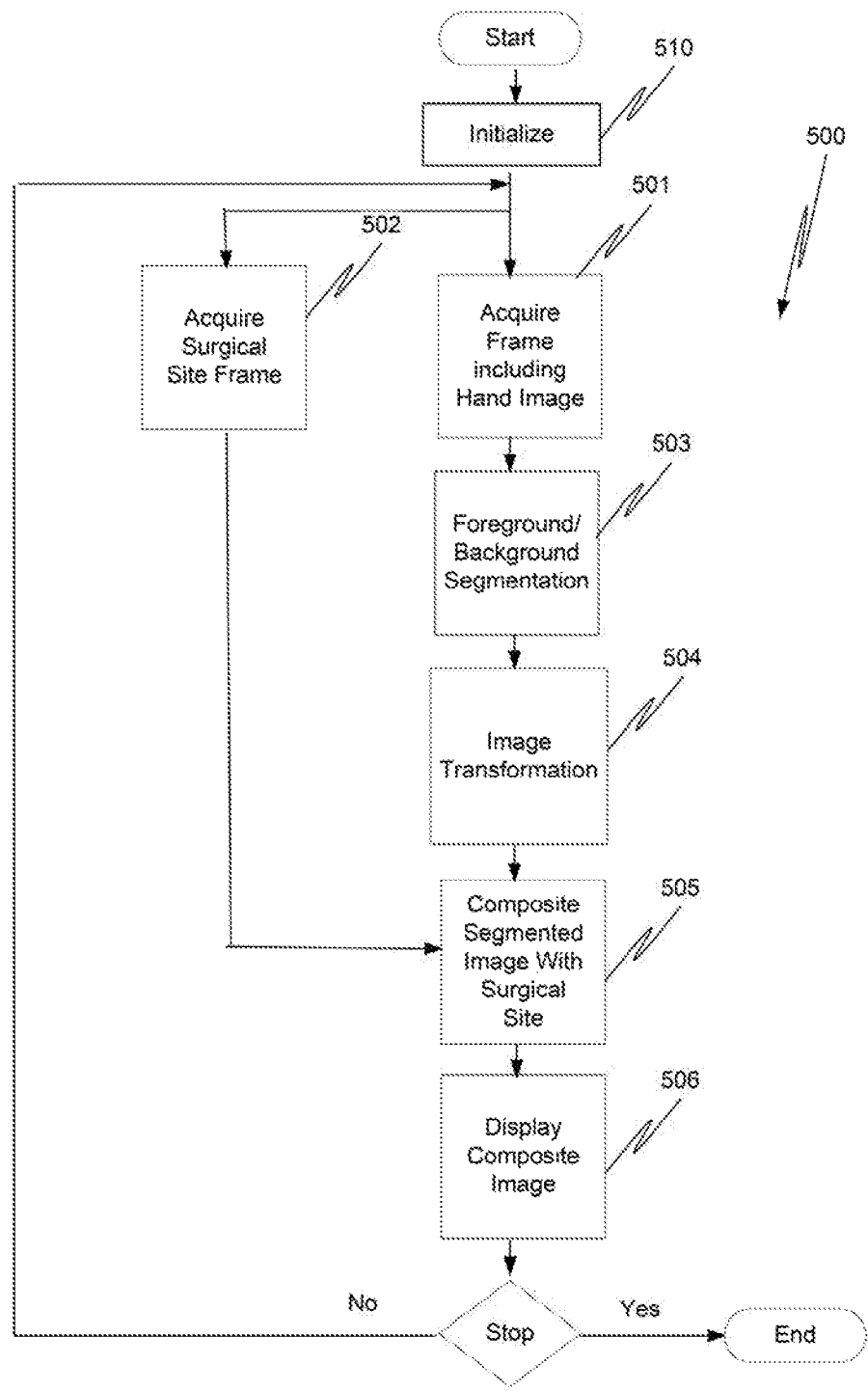
FIG. 5 is a process flow diagram for both the hand gesture aspects and the see-through console aspects.

FIG. 5 is a process flow diagram for a method 500 that is performed in a part by execution of an image proctor module 135 (FIGS. 1A, 1B) stored in a memory 132 on a processor 131, in one aspect. Although described herein as including executing a module on a processor, it is to be appreciated that method 500 may be implemented in practice by any combination of hardware, software that is executed on a processor, and firmware. Also, its functions, as described herein, may be performed by one unit, or divided up among different components, each of which may be implemented in turn by any combination of hardware, software that is executed on a processor, and firmware. When divided up among different components, the components may be centralized in one location or distributed across system 100A, 100B for distributed processing purposes.

Initially, an optional initialize process 510 selects data for use in process 500 specific to the user. For example, biometric information measured from the appearance of the user's hand(s), e.g., hand/finger dimensions, palm features, or other identifying characteristics visible on the user's hand(s) is used to identify the user. User specific data is then selected to initialize process 500 for that user, e.g., initializing initial skin tone for a color-classifier used in the segmentation processes described below. In one aspect, as described more completely below, process 510 includes a hand depth calibration procedure.

In acquire frame including hand image process 501 and acquire surgical site frame process 502, a frame of video image data from camera 330 and a frame of video image data from endoscope 112 are acquired. Those knowledgeable in the field understand that when a stereoscopic image is acquired, there is a left image frame of data and a right image frame of data that are captured, but the processing of the captured data is equivalent for both image frames. In method 500, a left and right distinction is not made, but when processing stereoscopic data, it is understood that the method 500 is performed for both left and right image frames of the acquired video image.

In this aspect, the frame of video image data from endoscope 112 is a conventional stereoscopic image frame that includes a stereoscopic image of the surgical site with images of any teleoperated slave surgical instruments within the field of view of stereoscopic endoscope 112. Thus, acquire surgical site frame operation 502 captures a conventional stereoscopic image of the surgical site.

The data acquired in process 501 depends on the implementation used for camera 330. When camera 330 is a depth sensing camera, the acquired data includes image color data and depth data for each pixel in the frame. When a color camera is used in place of depth-sensing camera 330, the acquired data includes only color image data for each pixel in the frame. The aspects where camera 330 is a depth sensing camera are considered first, and then aspects for the see-through console mode of operation that do not require a depth sensing camera are considered.

Figure 6A:
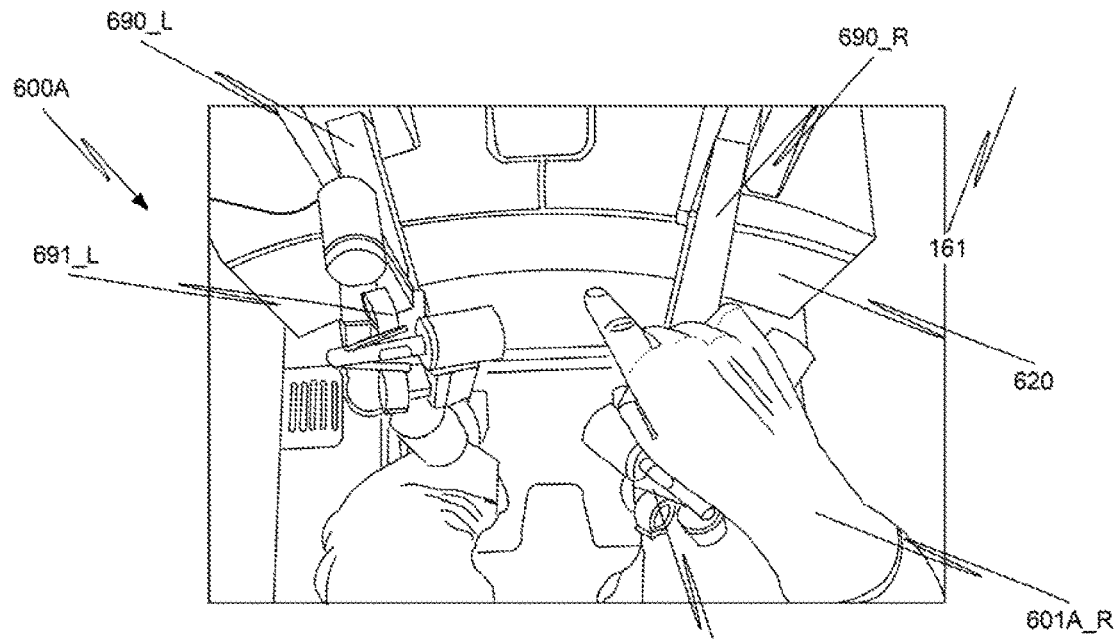
FIG. 6A is a representation of a color image obtained by a camera mounted in the viewer of the surgeon's console of FIG. 3.
Figure 6B:
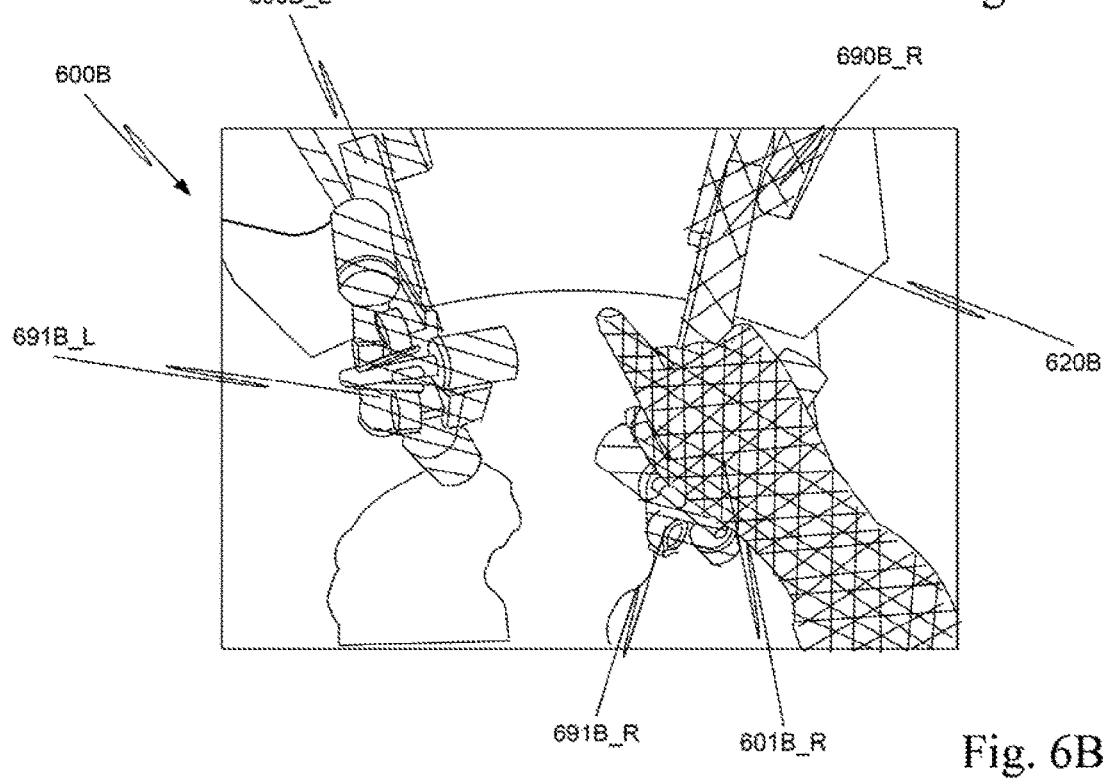
FIG. 6B is a representation of the depth data generated by a depth sensing camera mounted in the viewer of the surgeon's console mounted in FIG. 3.

FIG. 6A is an illustration of a color image captured in process 501 for surgeon's console 351. In FIG. 6A, elements 690_L, 691_L, 690_R, 691_R, and 620 in three-dimensional color image 600A are images of corresponding physical elements 390_L, 391_L, 390_R, 391_R, and 320, respectively, in FIG. 3. FIG. 6B is a representation of a grey-scale image 600B that provides a visual image of the depth data provided for color image 600A with time-of-flight camera 330.

In FIG. 6B, cross hatching is used to represent two general regions of different grey scale, but the cross-hatching does not accurately represent the variation in color across the two general regions. In the actual grey-scale image, the color of a pixel represents the depth (distance from camera 330) of that pixel in color image 600A. Pixels associated with elements of surgeon's console 351 further from camera 330 are lightest in color and pixels associated with elements closest to camera 330 are the darkest in color.

The variation in the color of the pixels between the lightest color and darkest color is an indication of the depth. In this aspect, the depth for a pixel is used and so representation 600B of the grey-scale image is provided to assist in visualizing the depth data that is acquired by time-of-flight camera 330.

Image 600B shows that the legs of surgeon 361 and base 620 are most distant from camera 330. Master tool manipulators 690_L, 691_L with master grips 690_R, 691_R are at an intermediate distance from camera 330, and right hand 601A_R is closed to camera 330.

As explained, more completely below, in one aspect, foreground/background segmentation process 503 uses the depth information to create an alpha mask for right hand image 601A_R (FIG. 6A). The alpha mask is used to extract right hand image 601A_R from image 600A, i.e., segment the pixels for right hand image 601A_R. Process 503 transfers to image transformation process 504.

In image transformation process 504, the segmented pixels of right hand image 601A_R can be transformed to achieve an apparent size and depth of the hands when displayed. For example, transformation process 504 adjusts the scale and image shift to position the hands near the working distance of the surgical instruments in the display image of viewer 310 and at a comparable size.

In one aspect, process 504 performs a perspective correct transformation of the pixels in the segmented hand image. Any transformation performed in process 504 on the segmented pixels of right hand image 601A_R is also performed on the alpha mask for right hand image 601A_R.

Image transformation process 504 generates transformed segmented pixels of right hand image 601A_R for superimposition on the surgical site image captured in process 502. Processing transfers from image transformation process 504 to composite segmented image with surgical site process 505.

As described above, foreground/background segmentation process 503 generated an alpha mask. Specifically, an alpha pixel buffer was generated that contained a second state, e.g., a zero, for pixels in the background and a first state, e.g., one, for pixels in the foreground, i.e., the pixels in the hand(s). Pixels in-between the foreground and the background have a value between zero and one, which are used for anti-aliasing edges. Optionally, the in between values can be used to feather the alpha mask towards the bottom extents of the view to de-emphasize the wrists and forearms. The alpha mask in the alpha pixel buffer is transformed in process 504 and stored back in the alpha pixel buffer.

In process 505, foreground hands pixels (Fg) of the hand(s) are composited on background pixels (Bg) of the surgical site image using alpha blending.

$$\text{Composite image pixel} = (1-\alpha)*Bg + \alpha*Fg$$

where $\alpha$ is the value in the transformed alpha mask for the pixel. Process 505 generates a composite image that is sent to viewer 310 for display in display composite image process 506.

If the augmented mode of operation that includes the hand gesture is stopped, processing ends. Otherwise, processes 501 to 506 are repeated for the next captured video image frame so that a sequence of composite images is displayed in viewer 310 as process 500 is repeated.

The above description of process 500 was for the hand gesture mode of operation. However, in one aspect with a depth sensing camera, e.g., a time-of-flight camera, process 500 is also used for the see-though console mode of operation.

For the see-through console mode of operation, processes 510, 501 and 502 are the same as described above. As explained, more completely below, in one aspect, foreground/background segmentation process 503 uses the depth information to create an alpha mask for right hand image 601A_R and master tool manipulator images 690_L, 690_R. The alpha mask is used to extract right hand image 601A_R and master tool manipulator images 690_L, 690_R from image 600A, i.e., segment the pixels for right hand image 601A_R and master tool manipulator images 690_L, 690_R, which are referred to as the segmented images. Process 503 transfers to image transformation process 504.

In image transformation process 504, the segmented pixels of right hand image 601A_R and master tool manipulator images 690_L, 690_R can be transformed to achieve an apparent size and depth of the hands when displayed. Again, any transformation performed in process 504 on the segmented images is also performed on the alpha mask for the segmented images.

In one aspect for the see-through console mode, process 504 is configured to make the segmented images appear closer than the image of the surgical field, e.g., a translation is applied to the segmented images. For example, a hand depth calibration is used in initialize process 510 to define a scale factor for the depth of the image of the user's hands.

In process 510, a graphic, e.g., a plane or a hand outline, is displayed in the viewer. In response to seeing the graphic, the user moves the user's hands to align the hand image, in the viewer, to this graphic in the depth dimension. The user's hands would then be at a known depth and a scale factor defined at this known depth. Thus, the known depth provides synthesized depth data for an image of hand. Similarly, synthesized depth data can be determined assigned to the pixels having the color of the master tool manipulators based on the kinematic data and geometry of the master tool manipulators. The synthesized depth data for the hand images and the master tool manipulator images can be used in transformation process 504.

Also, the synthesized depth data can be used to generate masks to extract an image or images from the video image in the segmentation process, and hence can be used as to generate an alpha mask. The synthesized depth data can be used in a manner equivalent to the way that the acquired depth data is used. The synthesized depth data can be assigned to specific pixels using, for example, color classifiers, or static image subtraction to isolate a particular set of pixels that correspond to the synthesized depth data.

Image transformation process 504 generates transformed segmented images for superimposition on the surgical site image captured in process 502. In some aspects for the see-through console mode of operation, transformation process 504 is not used, as the image of the hands and master tool manipulators is displayed in an orthostereo manner. When process 504 is complete, processing transfers from image transformation process 504 to composite segmented image with surgical site process 505.

In process 505, foreground pixels (Fg) of the segmented images are composited on background pixels (Bg) of the surgical site image using alpha blending.

$$\text{Composite image pixel} = (1-\alpha)*Bg + \alpha*Fg$$

where $\alpha$ is the value in the transformed alpha mask for the pixel. Process 505 generates a composite image that is sent to viewer 310 for display in display composite image process 506.

If the augmented mode of operation that includes the see-through console is stopped, processing ends. Otherwise, processes 501 to 506 are repeated for the next captured video image frame so that a sequence of composite images is displayed in viewer 310 as process 500 is repeated.

Figure 7A:
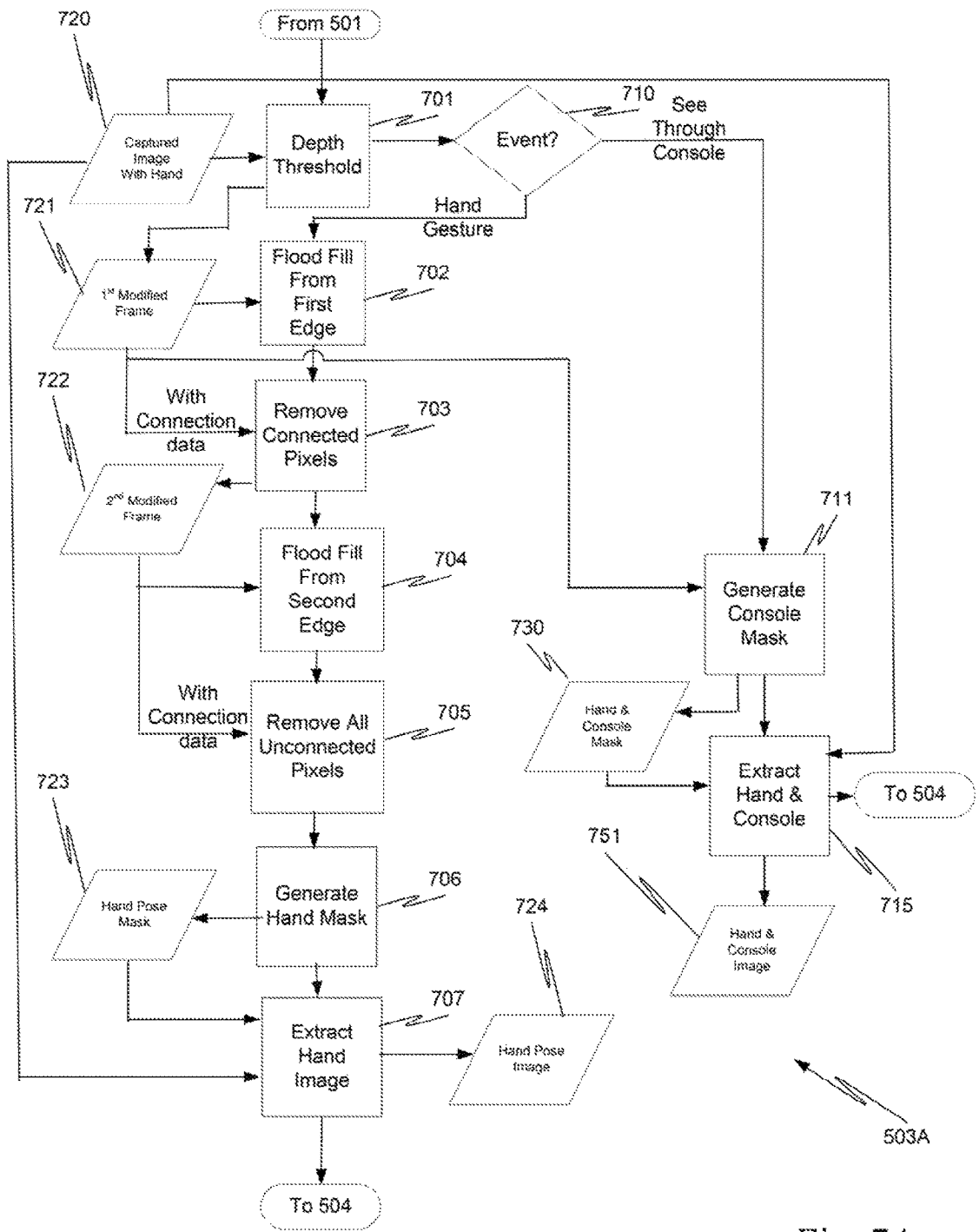
FIG. 7A is a process flow diagram for one aspect of the segmentation process of FIG. 5, when the depth data of FIG. 6B is available.

FIG. 7A is a more detailed process diagram for one aspect of foreground/background segmentation process 503 when a time-of-flight camera is used. Process 503 receives an image buffer of pixel data where each pixel has color data and a depth. A copy of the buffer of pixel data is represented as captured image with hand frame 720 in FIG. 7A.

Referring to FIG. 3, there are two limits, depth thresholds HGnear and HGfar, on the expected depth values observed for a hand pose. Hand gesture near threshold HGnear is at least the closest distance to camera 330 for which camera 330 can generate depth data. If this closest distance to camera 330 is within viewer 310, hand gesture near threshold HGnear is coincident with the underside of viewer 310. Hand gesture far threshold HGfar is positioned at a distance below armrest 315 (i) that can be reached by a hand when the forearm is resting on armrest 315 and (ii) that is above the top of the thigh of the surgeon when seated at console 351. Depth thresholds HGnear and HGfar are examples of first and second depth thresholds, respectively.

In one aspect, a heuristic is used for determining hand gesture far threshold HGfar based on the positions of viewer 310 and armrest 315. The heuristic assumes that a user positions viewer 310 and armrest 315 so that the user's hands and the master tool manipulators are not colliding with the user's knees.

In still yet another aspect, another heuristic defines a transformation that maps threshold HGfar to be coincident with a typical working distance to the tissue in view coordinates. This ensures that the image of the surgeon's hands appear to be in front of the tissue in the surgical site image when viewed with a stereo viewer.

In depth threshold process 701, the depth of each pixel is compared with a maximum depth threshold, e.g., hand gesture far threshold HGfar. If the depth of a pixel is greater than threshold HGfar, the pixel is removed and is not keep in first modified frame 721. Conversely, if the depth of the pixel is less than or equal to threshold HGfar, the pixel is retained in a first modified frame 721. Depth threshold process 701 eliminates pixels that are beyond the possible depth of the hand pose. Thus, the pixels in first modified frame 721 contain at least the hand pose image. First modified frame is stored in a buffer in data memory 133 (FIG. 1A), in one aspect.

Figure 8A:
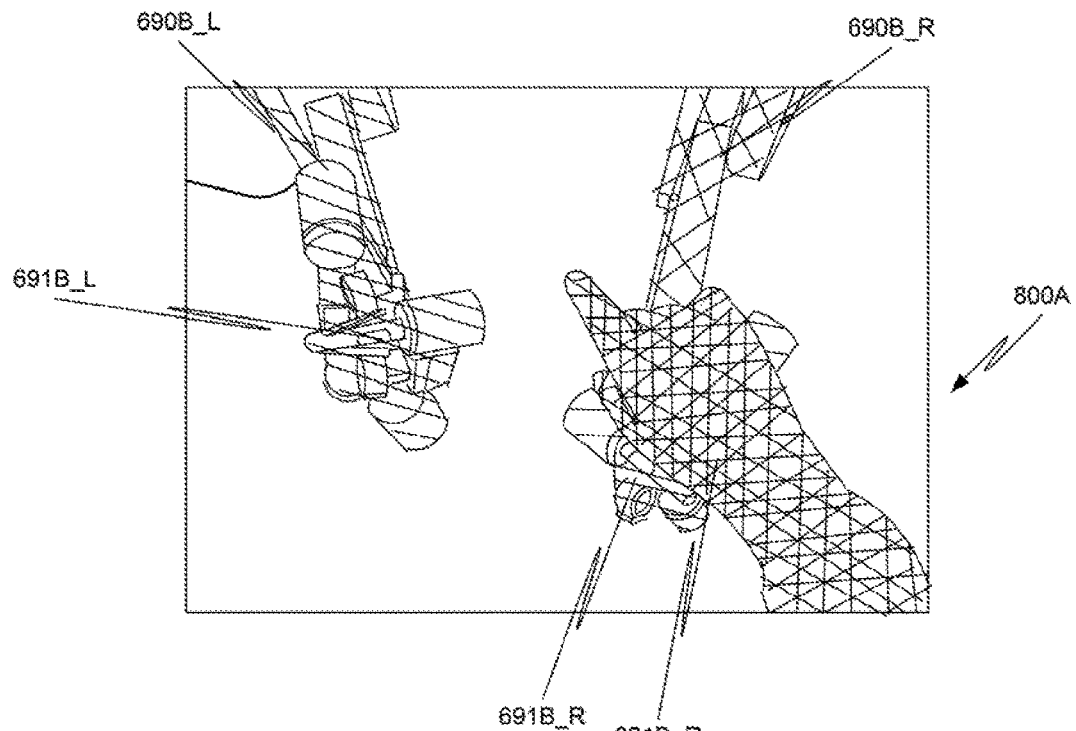
FIGS. 8A to 8C are representations of the data being processed at points in the process flow diagram of FIG. 7A.

FIG. 8A is a representation of the data in first modified frame 721 after applying the depth threshold to the data for the image in FIG. 6B. Notice that in FIG. 8A, base 620B and the surgeon's legs have been removed from the image in FIG. 6B.

Following completion of depth threshold process 701, processing transfers to event check operation 710. In this aspect, method 500 is launched when a surgeon selects a hand gesture mode of operation, a see-through console mode of operation, or both. In this example, a hand gesture mode of operation was selected and so processing transfers from event check operation 710 to flood fill from first edge process 702.

In the configuration of surgeon's console 351, master tool manipulator images 690B_L, 690B_R extend from a first edge of image 800A, e.g., the top edge, and never reach beyond the opposite edge of the image. See also image 600A (FIG. 6A) and image 600B (FIG. 6B). The images of any hands in the hand gesture extend from a bottom edge of image 800A, where this second edge is opposite and removed from the first edge.

In flood fill from first edge process 702, the edge of image 800A from which master tool manipulator images 690B_L, 690B_R extend is selected. A valid seed pixel for each of master tool manipulator images 690B_L, 690B_R is determined on that edge. A flood fill is done starting at each valid seed pixel to find connected pixels belonging to master tool manipulator images 690B_L, 690B_R. Here, pixels are considered connected if the depth values for the pixels are continuous within a specified tolerance. The tolerance is optimized to support successful flood fill for a variety of expected master manipulator poses while also kept small enough to detect discontinuities between a master manipulator and a user's hand hovering overtop.

Thus, in process 702, a depth of each of the pixels adjacent to the seed pixel is compared to the depth of the seed pixel. If the comparison indicates that any difference in the two depths is within the specified tolerance, the adjacent pixel is connected to the seed pixel. The comparison is then repeated for any unconnected pixels adjacent to the just connected pixel. This fill continues until the connected pixels are surrounded by a boundary of pixels that are not continuous within the specified tolerance and so are unconnected. Upon completion of the flood fill, processing transfers to remove connected pixels process 703.

Figure 8B:
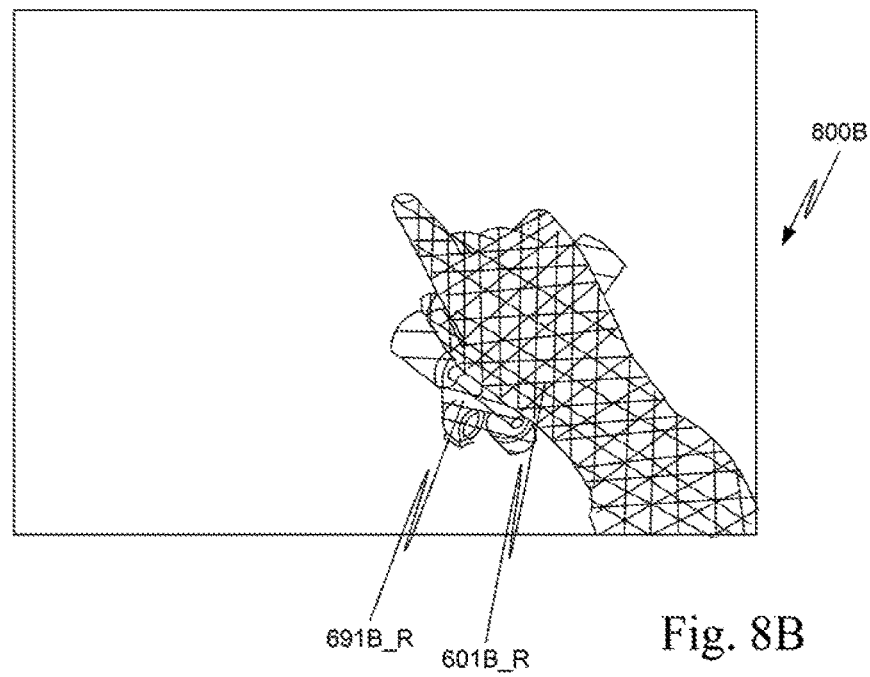

In process 703, the pixels connected to each of the seed pixels are removed from the frame and the result is stored as a second modified frame 722. In this example, process 703 started with the information illustrated in FIG. 8A, and the information of the pixels connected to each of the seed pixels in process 702. The data stored in second modified frame 722, for this example, is represented in image 800B (FIG. 8B).

In image 800B, all of master tool manipulator image 690B_L has been removed. However, only part of master tool manipulator image 690B_R has been removed. Right master grip image 691B_R remains in image 800B.

The reason that right master grip image 691B_R remains is that as the fill progressed from the seed pixel associated with master tool manipulator image 690B_R, the pixels for the folded fingers in right hand pose image 601B_R were encountered. The depths of the pixels for the folded fingers were not continuous with the depths of the pixels of master tool manipulator image 690B_R within the specified tolerance and so the flood fill was stopped. Hence, the pixels for right master grip image 691B_R could not be reached by the flood fill and so were not in the connected pixels. Upon completion of process 703, processing transfers to flood file from second edge 704

In flood fill from second edge process 704, the edge of image 800A from which the hand image or images extend is selected. A valid seed pixel for each of the hand images, e.g., right hand image 601B_R, is determined on that edge. A flood fill is done starting at each valid seed pixel to find connected pixels belonging to each hand image. Again, pixels are considered connected if the depth values for the pixels are continuous within a specified tolerance. The tolerance is optimized to support successful flood fill for a variety of expected hand poses while also kept small enough to detect discontinuities between a master manipulator and a user's hand hovering overtop.

In process 704, a depth of each of the pixels adjacent to the seed pixel is compared to the depth of the seed pixel. If the comparison indicates that any difference in the two depths is within the specified tolerance, the adjacent pixel is connected to the seed pixel. The comparison is then repeated for any unconnected pixels adjacent to the just connected pixel. This fill continues until the connected pixels are surrounded by a boundary of pixels that are not continuous within the specified tolerance and so are unconnected. Upon completion of the flood fill, processing transfers to remove unconnected pixels process 705.

Figure 8C:
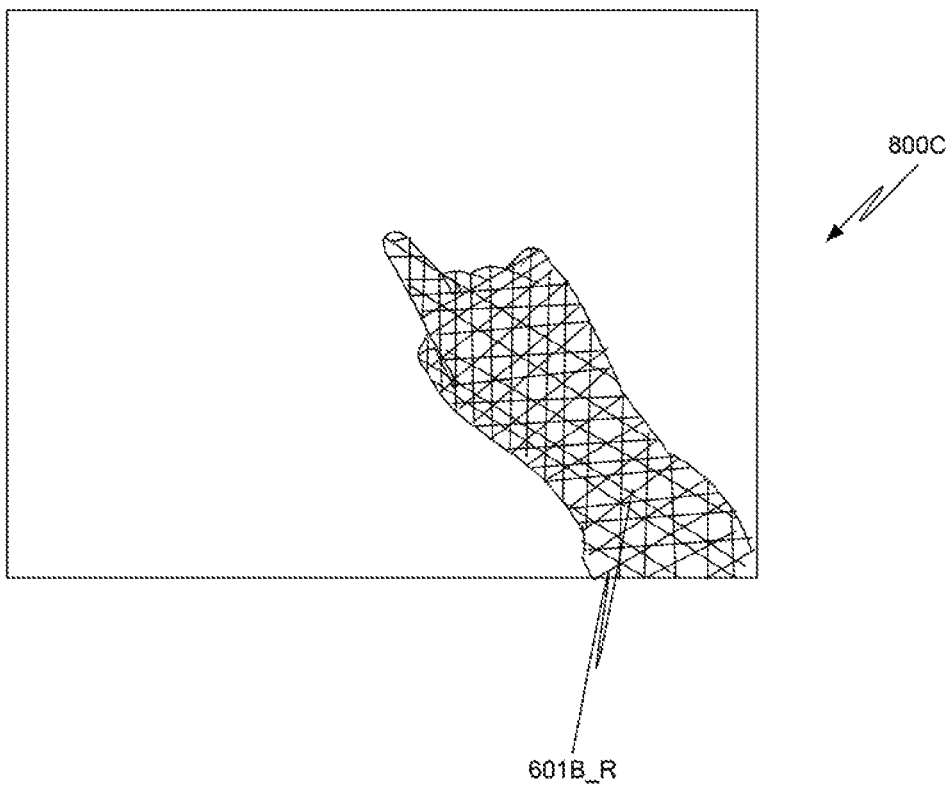

In process 705, the pixels that are not connected to a seed pixel are removed from the frame. In this example, process 705 started with the information illustrated in FIG. 8B, and the information of the pixels connected to each seed pixel in process 704. The result of process 705, for this example, is represented as image 800C (FIG. 8C).

In image 800C, right master grip image 691B_R has been removed. The pixels for right hand pose image 601B_R remain. Upon completion of process 705, processing transfers to generate hand mask 706.

Figure 8D:
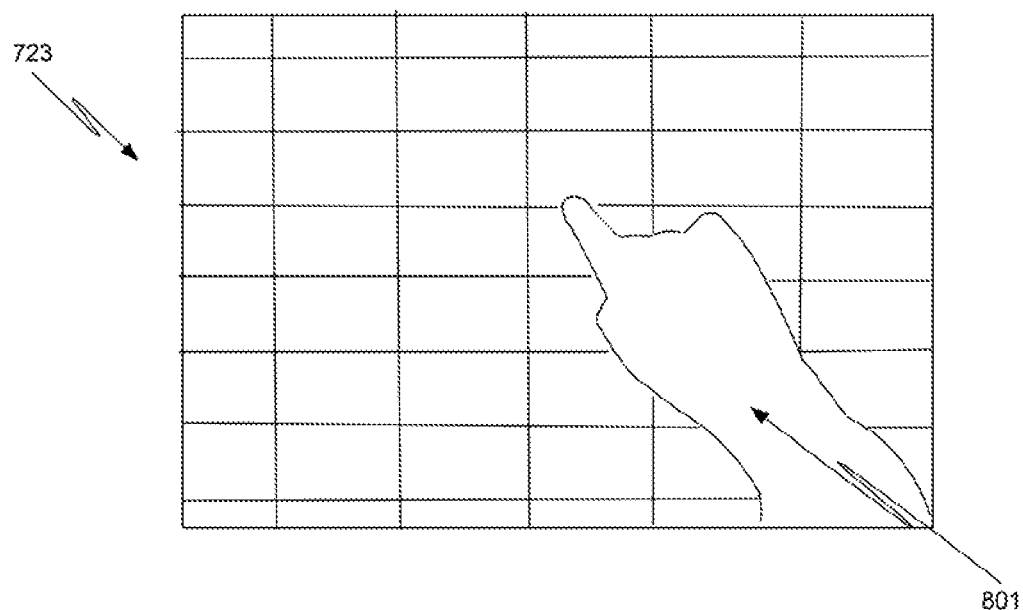
FIG. 8D is a representation of the hand pose mask.

In generate hand mask 706, all the pixels in right hand pose image 601B_R are set to a first state, e.g., one, and the other pixels in the frame are set to a second state different from the first state, e.g., zero to make hand pose mask 723. In some aspects, a neighborhood of pixels near an edge of the mask can be identified as candidates for refinement to produce a smoother anti-aliased boundary between hand pixels and non-hand pixels. One option is to set these boundary alpha values based on the probability that a color pixel is a hand pixel color. The probability function produces a value in the range [0, 1]. Higher probability maps to more opacity and lower probability maps to less opacity. The hand color distribution used by the probability function can also be trained on the fly using the initial set of color pixels identified by the hand flood fill. This allows the process to work reliably without a priori knowledge of the surgeon's skin color or changing illumination conditions In one aspect, hand pose mask 723 is stored in a buffer. FIG. 8D is a representation of hand pose mask 723. Clear hand image 801 represents pixels having the first state. The cross hatch region represents pixels having the second state. Process 706 transfers to extract hand process 707.

Figure 8E:
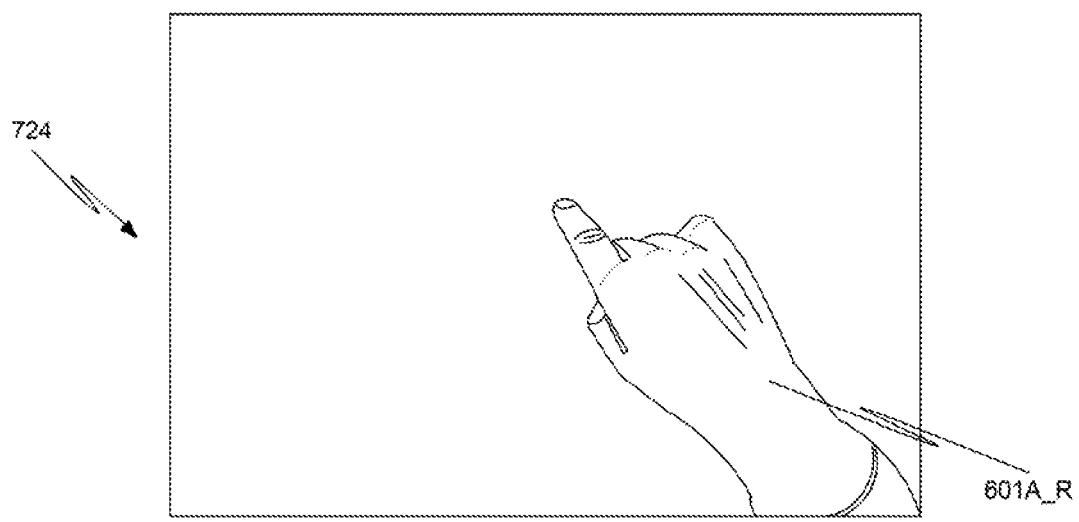
FIG. 8E is an illustration of the segmented hand pose image.

Extract hand process 707 uses hand pose mask 723 to extract the pixels of the hand pose image from image 720, which was stored in a buffer. Extract hand process 707 generates a frame that includes pixels in image 600A corresponding to the pixels in hand pose mask 723 having the first state. The other pixels in the frame are zero. Hand pose frame 724 with just the color hand pose image is stored in a buffer. FIG. 8E is an illustration of hand pose frame 724 for this example.

In the above description, the assumption was that only a hand gesture event was received by process 503. However, as described above, process 503 can receive a hand gesture event, a see-through console event or both events, in one aspect. When process 71 (FIG. 7A) receives a see-through console event, event check 710 transfers to generate console mask operation 711.

Recall that prior to event check operation 710 depth threshold process 701 removed all pixels having a depth greater than hand gesture far threshold HGfar. Thus, the non-zero pixels stored in first modified frame 721 include images of the master tool manipulators and any hands of the surgeon within the field of view of camera 330. See FIG. 6A.

In generate console mask process 711, the pixels remaining in the image upon completion of process 701 are set to the first value and the other pixels are set to the second value. Process 711 is equivalent to process 706. Process 711 generates hand and console mask 730. Process 711 transfers to extract hand and console process 712.

Figure 9:
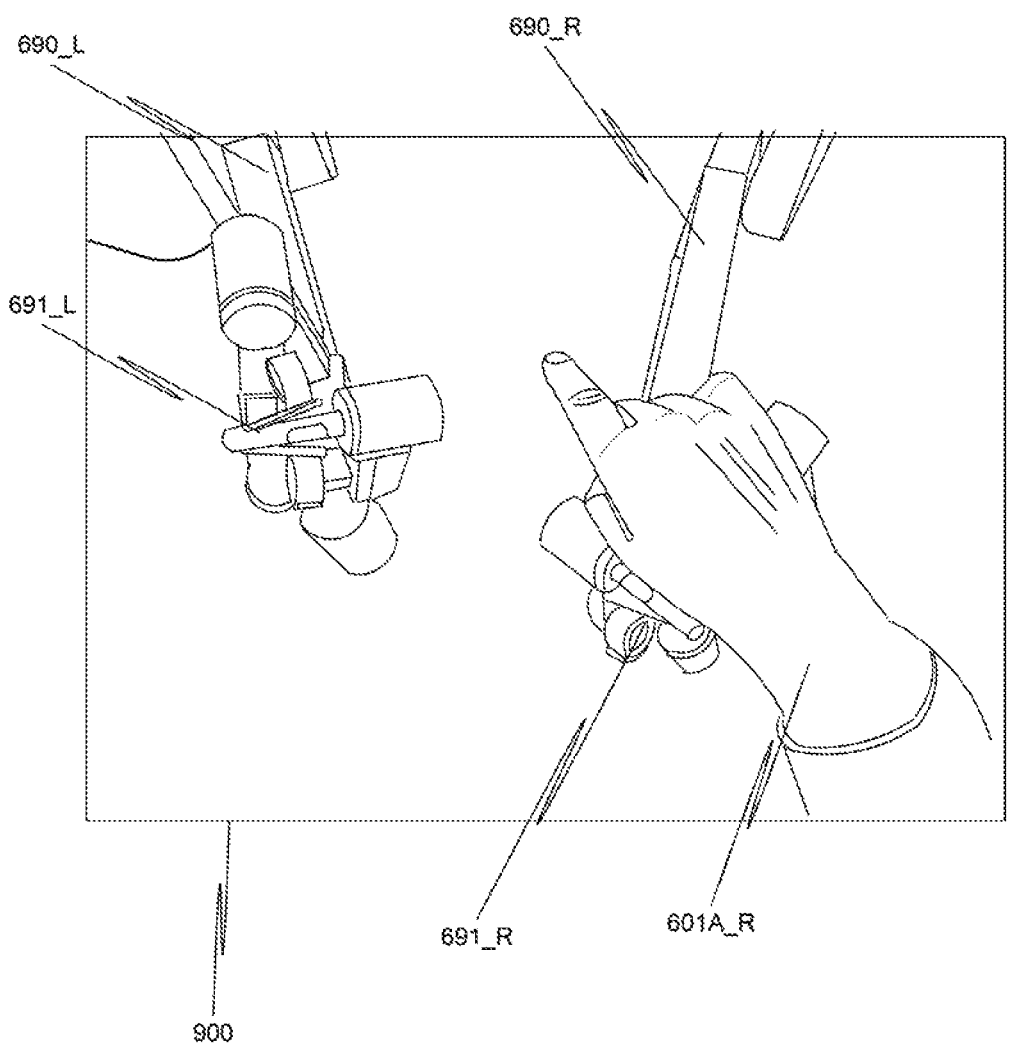
FIG. 9 is an illustration of the segmented hand image and master manipulator image obtained using either of the processes illustrated in FIGS. 7A and 7B.

Extract hand and console process 712 uses hand and console mask 730 to extract pixels from image 600A in buffer 720. Extract hand console process 712 generates a hand and console image frame 751 that includes pixels in image 600A corresponding to the pixels in hand and console mask 730 having the first state. The other pixels in frame 751 are zero. Frame 751 with just the hand image or images and the master manipulator images, i.e., the hand and console image, is stored in a buffer. Image 900 (FIG. 9) is the result of process 715 for this example. Image 900 was used to generate the images in FIGS. 2D to 2F that were described above.

In the above description of process 503, only depth data was utilized. However, this is illustrative only and is not intended to be limiting. Various refinements can be utilized to supplement segmentation process 503.

For example, in one aspect, both color pixel information and depth information can be used to improve the quality and robustness of the alpha masks generated. A skin color classifier can be used to refine the boundary of the hand pose mask. A master tool manipulator and console color classifier can be used to remove pixels from the hand pose mask that match the colors of either the master tool manipulators and/or the console.

In one aspect as described more completely below, color cameras are positioned at the two viewpoints in FIG. 4, and a time-of-flight camera is positioned on the centerline between the two viewpoints. The image from the time-of-flight camera is transformed to match the color camera viewpoints and method 500 is performed using the transformed depth data.

However, the resolution of the color cameras and the time-of-flight camera may not be the same, e.g., the color cameras may have a higher resolution, more pixels, than the time-of-flight camera. Hence, the depth for a pixel from the time-of-flight camera image may be associated with a group of color pixels in the color camera image.

In one aspect, when the flood fill is being performed and a pixel is identified as a boundary depth pixel, e.g., cannot be connected to any adjacent unconnected pixels, the appropriate color classifier for the flood fill can be used to test the color pixels around the boundary depth pixel and adjacent color pixels having the same depth as the boundary depth pixel to more precisely define the border of the image.

In another aspect, an initial image of console 351 is used as a static background and pixels which are different from pixels in this static background are identified in determining the boundary of any hand pose image. Alternatively, colors in the static background could be used to identify the locations of the master tool manipulators in a configuration where the manipulators were not constrained to one edge of the image as in the above example.

To further supplement the depth data from time-of-flight camera 330, the kinematic data for the master tool manipulators can be used. As described above, the coordinates of the master tool manipulators are maintained by the control system of minimally invasive surgical system 100A, 100B. The camera mapping from world coordinates to camera image coordinates is also known. Thus, using the camera mapping, the known coordinates and geometry of the master tool manipulators can be rendered into an image space depth representation, similar to that generated by time-of-flight camera 330. This supplemental image mask can be used to directly identify pixels which correspond to the master tool manipulators.

In image transformation process 504 (FIG. 5), various transformations of the segmented hand pose image can be implemented. In one aspect, three mappings are considered, a camera mapping M, an image mapping S, and a perspective mapping P. Camera mapping M maps points in world coordinate frame 396 into view coordinate frame 395. Perspective mapping P maps points in view coordinate frame 395 into a normalized coordinate system. Image mapping system S maps points in the normalized coordinate system into pixels in the image coordinate system of time-of-flight camera 330, in this aspect. In the image coordinate system, the X- and Y-dimensions are in pixel units and the Z coordinate is in depth units.

Expression (1) is a four by four homogenous transformation which maps points in world coordinates to pixels in image coordinates.

$$\begin{bmatrix} \hat{x}_s \\ \hat{y}_s \\ \hat{z}_s \\ w \end{bmatrix} = S * P * M * \begin{bmatrix} x_w \\ y_w \\ z_w \\ 1 \end{bmatrix} \tag{1}$$

where $$[x_s \ y_s \ z_s] = \begin{bmatrix} \hat{x}_s & \hat{y}_s & \hat{z}_s \\ w & w & w \end{bmatrix},$$

and w is the homogenous coordinate used in the transformation.

Expression (2) maps pixels in image coordinates to points in world coordinates, and is the inverse transformation of expression (1).

$$\begin{bmatrix} \hat{x}_w \\ \hat{y}_w \\ \hat{z}_w \\ w \end{bmatrix} = M^{-1} * P^{-1} * S^{-1} * \begin{bmatrix} x_s \\ y_s \\ z_s \\ 1 \end{bmatrix} \tag{2}$$

where $$[x_w \ y_w \ z_w] = \begin{bmatrix} \dfrac{\tilde{x}_w}{w} & \dfrac{\tilde{y}_w}{w} & \dfrac{\tilde{z}_w}{w} \end{bmatrix}.$$

Perspective projection mapping P is:

$$P = \begin{bmatrix} \dfrac{2*near}{right-left} & 0 & \dfrac{right+left}{right-left} & 0 \\ 0 & \dfrac{2*near}{top-bottom} & \dfrac{top+bottom}{top-bottom} & 0 \\ 0 & 0 & \dfrac{far+near}{far-near} & \dfrac{2*far*near}{far-near} \\ 0 & 0 & -1 & 0 \end{bmatrix}$$

where near is the positive valued depth distance of a near depth sensing plane in view coordinates, which is at the start of the depths measured by the time-of-flight camera, and in which hand gesture near threshold HGnear lies;

far is the positive valued depth distance of a far depth sensing plane in view coordinates, which is at the maximum limit of depths measured by the time-of-flight camera, and in which hand gesture far threshold HGfar lies;

left is the position of the left edge of the near depth sensing plane in view coordinates;

right is the position of the right edge of the near depth sensing plane in view coordinates;

top is the position of the top edge of the near depth sensing plane in view coordinates; and bottom is the position of the bottom edge of the near depth sensing plane in view coordinates.

Figure 10:
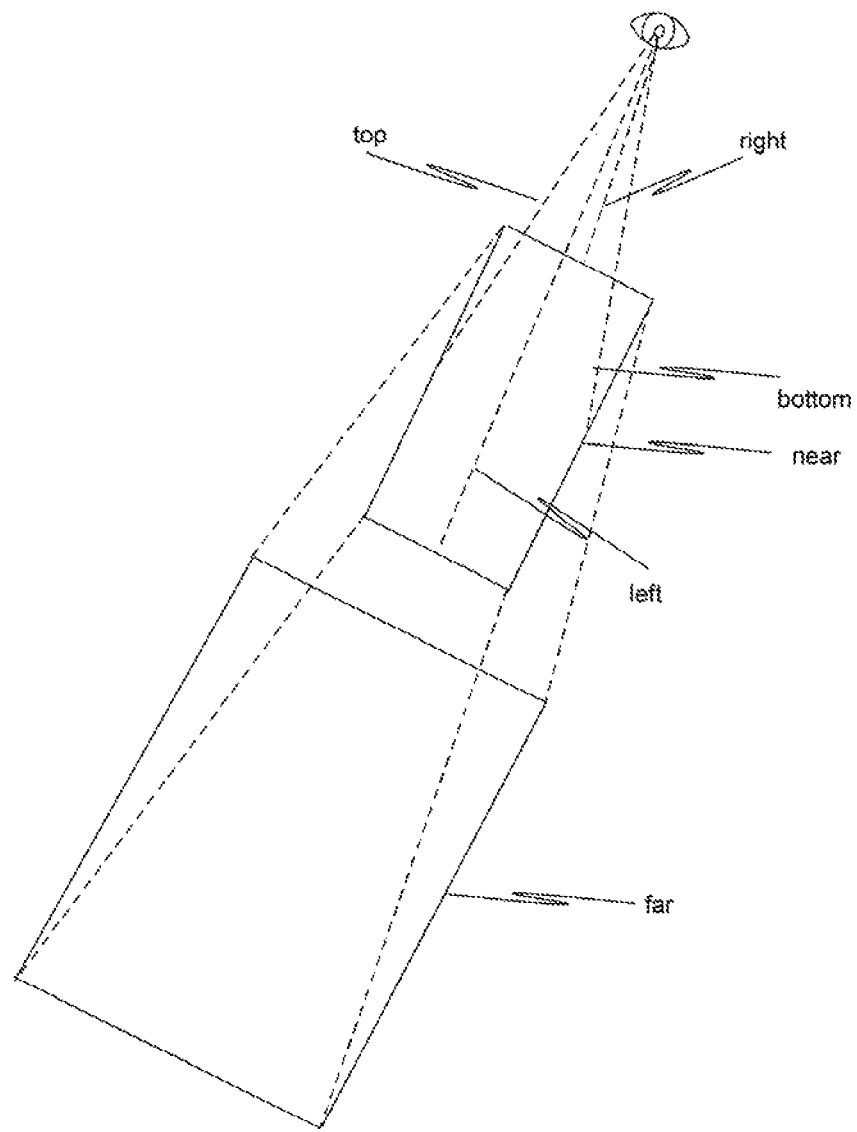
FIG. 10 is an illustration of the lengths used in one aspect of the perspective transformation.

FIG. 10 is an illustration of the distances used in the perspective projection mapping. Perspective projection mapping P maps points in view coordinates to points in normalized coordinates with values between plus and minus one in all dimensions.

Image mapping S is:

$$S = \begin{bmatrix} \dfrac{w}{2} & 0 & 0 & \dfrac{w}{2} \\ 0 & \dfrac{h}{2} & 0 & \dfrac{h}{2} \\ 0 & 0 & \dfrac{d}{2} & \dfrac{d}{2} \\ 0 & 0 & 0 & 1 \end{bmatrix}$$

where w is the image width in pixels;
  h is the image height in pixels; and
  d is the maximum image depth value.

Image mapping S may be defined for use with either the depth image or color image depending on the target image space. Depth parameter d is assumed to be zero for the color image, which corresponds to the near plane.

The three transformations just described, in one aspect, are used to perform a perspective correct transformation of the hand images and/or the see through console images. For instance, a transformation can be applied to change the apparent scale and depth of the hands to match the scale and depth of the surgical instruments. A general translation, rotation, and scale transformation T can be applied in world coordinates using the following concatenation of transformations.

$$\begin{bmatrix} \tilde{x}'_s \\ \tilde{y}'_s \\ \tilde{z}'_s \\ w \end{bmatrix} = (S*P*M)*T*(M^{-1}*P^{-1}*S^{-1}) * \begin{bmatrix} x_s \\ y_s \\ z_s \\ 1 \end{bmatrix}$$

$$[x'_s \ y'_s \ z'_s] = \begin{bmatrix} \dfrac{\tilde{x}'_s}{w} & \dfrac{\tilde{y}'_s}{w} & \dfrac{\tilde{z}'_s}{w} \end{bmatrix}$$

However, alternatively, one could scan fill the target transformed pixel buffer by using the inverse of the transformation above and bilinear interpolation of the pixels from the source image buffer.

The examples discussed above assumed stereo depth sensing cameras. In another aspect, a single depth sensing camera, e.g., a single time-of-flight camera, is used. Depth values from the single time-of-flight camera are used in rendering stereo visual images. Referring to FIG. 4, the time-of-flight camera is positioned on the centerline between the two view points represented by the eyes in FIG. 4.

The two stereo views are produced by transforming the pixels from the time-of-flight camera into view coordinates, applying a translation along X-axis Xview of half the interpupilary distance IPD (FIG. 4) and then transforming the result back into image space. Thus, the transformation T, for the left and right stereo views respectively, is:

$$T_{IPD\_L} = \begin{bmatrix} 1 & 0 & 0 & -\dfrac{IPD}{2} \\ 0 & 1 & 0 & 0 \\ 0 & 0 & 1 & 0 \\ 0 & 0 & 0 & 1 \end{bmatrix}$$

$$T_{IPD\_R} = \begin{bmatrix} 1 & 0 & 0 & \dfrac{IPD}{2} \\ 0 & 1 & 0 & 0 \\ 0 & 0 & 1 & 0 \\ 0 & 0 & 0 & 1 \end{bmatrix}$$

The transformation is:

$$\begin{bmatrix} \tilde{x}'_s \\ \tilde{y}'_s \\ \tilde{z}'_s \\ w \end{bmatrix} = (S*P)*T_{IPD\_i}*(P^{-1}*S^{-1}) \begin{bmatrix} x_s \\ y_s \\ z_s \\ 1 \end{bmatrix}$$

$$[x'_s \ y'_s \ z'_s] = \begin{bmatrix} \dfrac{\tilde{x}'_s}{w} & \dfrac{\tilde{y}'_s}{w} & \dfrac{\tilde{z}'_s}{w} \end{bmatrix}$$

where i is L for the left stereo view and R for the right stereo view.

The processing for the augmented display including the hand gesture and/or the see-through console image does not introduce any latency. The transformations described above used the segmented hand gesture as an example. The transformations can also be used for the segmented images used in the see-through console mode of operation and for the combination of the two modes of operation. The description is not repeated for each of the various modes.

The above examples used depth information from a time-of-flight camera in the segmentation process. However, as indicated above, in the see-through console mode of operation, camera 330 in console 351 can be replaced with a color camera that does not provide depth information. A color camera acquires image 600A (FIG. 6A), but the depth information represented in FIG. 6B is not available. However, in this example, master tool manipulators 690_L, 690_R (FIG. 6A) have a known color (or colors) that is different from other colors in the image.

Figure 7B:
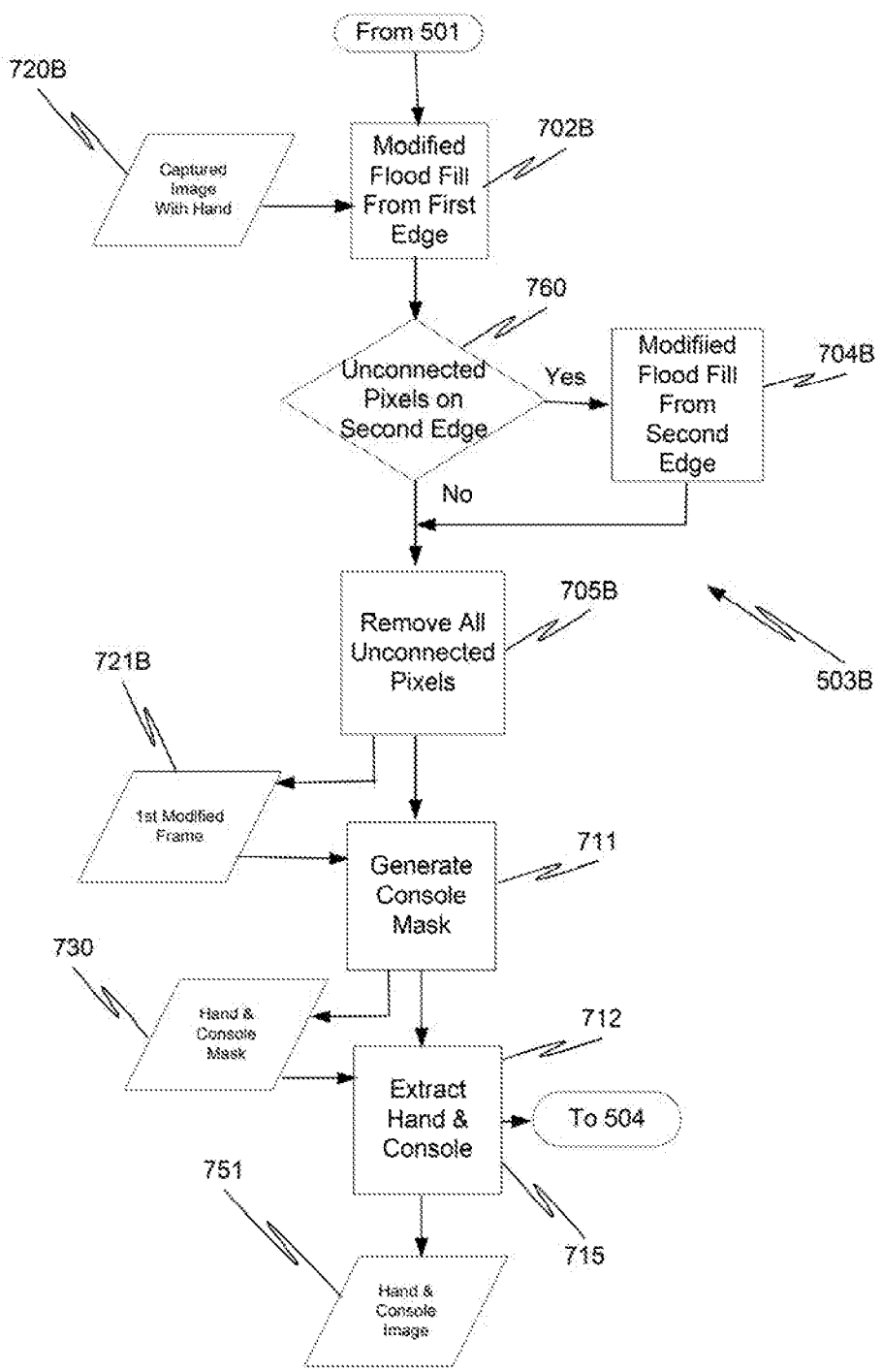
FIG. 7B is a process flow diagram for one aspect of the segmentation process of FIG. 5, when the depth data of FIG. 6B is unavailable.

In this aspect, foreground/background segmentation process 503B (FIG. 7B) is used in process 500 for foreground/background segmentation process 503.

Process 503B receives an image buffer of pixel data where each pixel has color data. A copy of the buffer of pixel data is represented as captured image with hand frame 720B in FIG. 7B.

In the configuration of surgeon's console 351, master tool manipulator images 690_L, 690_R extend from a first edge of image 600A, e.g., the top edge, and never reach beyond the opposite edge of the image. The images of any hands in image 600A extend from a second edge of image 600A, where the second edge is opposite and removed from the first edge. The color classifier processing can take advantage of the topology of this configuration by using a flood fill approach. However, the flood fill process assumes that there are no significant discontinuities in color along a user's hands or arms.

In modified flood fill from first edge process 702B, the edge of image 600A from which master tool manipulator images 690_L, 690_R extend is selected. A valid seed pixel for each of master tool manipulator images 690_L, 690_R is determined on that edge based on the known color of the master manipulators. A flood fill is done starting at each valid seed pixel to find connected pixels belonging to master tool manipulator images 690_L, 690_R or any hand image. Here, pixels are considered connected if the color values for the pixels are the known color of the manipulators or a skin color, where are referred to as the specified colors.

Thus, in process 702, a color of each of the pixels adjacent to the seed pixel is compared to each of the specified colors. If the comparison indicates the color of the adjacent pixel is one of the specified colors, the adjacent pixel is connected to the seed pixel. The comparison is then repeated for any unconnected pixels adjacent to the just connected pixel. This fill continues until the connected pixels are surrounded by a boundary of pixels that do not have any of the specified colors.

However, the flood fill may have been interrupted by a ring, watch, sleeve, etc. of the surgeon that does not have one of the specified colors. Thus, when the flood fill is being performed and a pixel is identified as a boundary pixel, e.g., cannot be connected to any adjacent unconnected pixels, other additional color classifier(s) for the flood fill can be used to test the color pixels around the boundary pixel. These color classifiers test for the colors of objects typically found on the fingers, wrist and forearm of a surgeon.

If the additional color classifiers result in more pixels being connected, the specified color classifiers can also be used to determine if the fill should continue beyond the boundary of the object(s) having a color corresponding to the additional color classifiers. Upon completion of the modified flood fill, processing transfers to unconnected pixels on second edge check operation 760.

Unconnected pixels on second edge check operation 760 determines whether there are unconnected skin colored pixels on the second edge. If the hand or hands of the surgeon are on or over the master tool manipulators, operation 702B connects the pixels in the hand images. However, if a hand or hands of the surgeon is in the image and not over the master tool manipulators, process 702B does cannot reach the images and so there are unconnected skin color pixels on the second edge.

If there are no unconnected skin colored pixels on the second edge, check process 760 transfers to remove all unconnected pixels process 705B. In one aspect, check process 760 checks for unconnected skin color pixels along the second edge and if none are found, the second edge is also checked with the additional color classifiers to determine whether pixels for a watch, sleeve etc of the surgeon are on the second edge. If no unconnected pixels are found for the additional color classifiers, check process 760 then transfers to process 705B. Conversely, if there are unconnected skin colored pixels or unconnected pixels having the color of the additional color classifiers on the second edge, check process 760 transfers to modified flood fill from second edge process 704B.

In modified flood fill from second edge process 704B, the edge of image 600A from which the hand image or images extend is selected. A valid seed pixel for each of the hand images on that edge is selected using the skin color pixels or other color pixels found in check process 760. A flood fill is done starting at each valid seed pixel to find and connect pixels belonging to a hand image, i.e., pixels having a skin color or a color for one of the additional color classifiers. Upon completion of the flood fill, processing transfers to remove unconnected pixels process 705B.

In process 705B, the pixels that are not connected to a seed pixel are removed from the frame. In this example, process 705B started with the information illustrated in FIG. 6A, and the information of the pixels connected to each seed pixel in processes 702B and 704B. The result of process 705, for this example, is stored as a first modified frame 721B. Upon completion process 705B transfers to generate console mask process 711.

In generate console mask process 711, the pixels remaining in the image upon completion of process 701 are set to the first value and the other pixels are set to the second value. Process 711 is equivalent to process 706. Process 711 generates hand and console mask 730. Process 711 transfers to extract hand and console process 712.

The use of the modified flood fills to identify pixels in the images of the hand(s) and master tool manipulator(s) is illustrative only and is not intended to be limiting. For example, in another aspect an initial image of console 351 and the surgeon's hands is used as a static background and pixels which are different from pixels in this static background are identified in determining the boundary of the image in frame 720B. This boundary in one aspect is used in generating the hand and console mask. In another aspect, the boundary is used in refining the mask obtained in process 711 after using the modified flood fill(s).

The processes just described to perform the segmentation process are illustrative only. In another aspect, a chroma-key method is used in a color classifier segmentation. This method assumes a restriction on the color of the foreground or background. For instance, the surgeon wears solid colored surgical gloves while operating at the console, and the master tool manipulators are painted a unique solid color. Thus, the hands and master tool manipulators can be identified as foreground objects using a priori knowledge of their colors.

Conversely, a solid colored drape could be used within the console to produce a unique background color without imposing a restriction on the hand color or master tool manipulator color. This drape is attached and hung from the bottom of armrest 315 and extends across to base 320 of the console (FIG. 3). The drape effectively covers the surgeon's knees, feet, and the foot pedal assembly of the console. The drape is made loose enough to not interfere with motion of the master tool manipulators. This chroma-key method can be applied in a global manner to perform any color based segmentation of process 503 described herein. In addition, other segmentation methods could be used, e.g., an articulated hand model.

Extract hand and console process 712 uses hand and console mask 730 to extract pixels from image 600A in buffer 720. Extract hand console process 712 generates a hand and console image frame 751 that includes pixels in image 600A corresponding to the pixels in hand and console mask 730 having the first state. The other pixels in frame 751 are zero. Frame 751 with just the hand image or images and the master manipulator images, i.e., the hand and console image, is stored in a buffer. Image 900 (FIG. 9) is the result of process 715 for this example also. Image 900 can be used to generate the images in FIGS. 2D to 2F that were described above.

In the above example, color classifiers were effectively used to do the flood fill. In another aspect, a static image of the master tool manipulators is used to connect the pixels in image 600A that represent the image of the master tool manipulators and a flood fill using the skin color classier is used to connect the pixels in the hand images. Again, the process removes the unconnected pixels and proceeds as described above.

In image transformation process 504, scale and translation transformations can be applied so that the hands and master tool manipulators appear at a similar scale and depth to the surgical instrument. However, since there is no per pixel depth information, the perspective effect is not as convincing as in the process of FIG. 7A. The depth coordinate of the image mapping can be ignored by setting the maximum image depth value d to zero.

Processes 505 and 506 are equivalent to those described above when the segmentation is done using process 503B and so are not repeated. In the above description, the see-through console image was positioned to appear in front of the surgical site image to avoid confusing the depth perception of the surgeon. Alternatively, the see-through image console image could be superimposed on the surgical site image for only one eye of the surgeon.

In view of the above description, other embodiments can be implemented. For example, a console can be located at the patient-side. The console, in one aspect, includes a depth sensing camera. A proctoring surgeon is assisting/retracting with a laproscopic tool in one hand and using the other hand to gesture, which is displayed in the viewer overlaid on the surgical site.

Also, in another example, a surgeon is working at a surgical console and an assistant/student/observer is looking at the assistant display or watching a recorded video. In this case, the proctoring surgeon interrupts movement of the slave instruments by removing his hands from the master tool manipulators and makes a gesture. The gesture is overlaid on the image of the surgical site and displayed on the assistant display. For instance, the proctoring surgeon uses the hand gesture overlay to show the assistant where to grasp with a laproscopic tool or explains an operative approach on a procedure guide video. In this aspect, the proctoring surgeon could also use the see-through console mode to show the observer a grasping technique with the master gripper.

Also, the depth data could all be synthesized. For example, as described above, the hand depth calibration procedure can be use to determine a depth of the user's hands. In this procedure, a graphic is displayed in the viewer at a known depth. The user moves the user's hands to align the image of the user's hands with the graphic and so the depth of an image of the user's hands can be synthesized based on the known depth of the graphic.

As explained above, synthesized depth data also can be generated for an image of the master tool manipulators. The coordinates of the master tool manipulators are maintained by the control system of minimally invasive surgical system 100A, 100B. The camera mapping from world coordinates to camera image coordinates is also known. Thus, using the camera mapping, the known coordinates and geometry of the master tool manipulators can be rendered into an image space depth representation, similar to that generated by time-of-flight camera 330. This supplemental image mask can be used to directly identify pixels which correspond to the master tool manipulators.

Thus, a conventional segmentation process, e.g., the chroma-key method, is used for the acquired color images, and as a color of a pixel in an image is identified as belonging to either the master tool manipulators or the user's hands, a synthesized depth is assigned. Thus, each color pixel is assigned a depth. The processes described above that utilize depth could be performed using the color data and the synthesized depth data.

In some aspects, the various processes in process 500 may not be able to be performed. Nevertheless, a combined image is generated using the synthesized depth data. In these aspects, color image data is available for either the hand gesture mode of operation, the see-through console mode of operation or both. The images are segmented using conventional methods, e.g., chroma-key segmentation, and the depth data is synthesized as just described. An alpha mask is generated using the synthesized depth data. The alpha mask is used to combine the segmented images with the surgical site image as described above.

In this aspect, the depth data is used to directly generate the alpha mask values used when compositing the foreground and background images. This process takes pixel location and depth values as input and produces alpha values in the alpha mask as output. For instance, the depth data is mapped so that values between depth threshold HGfar and depth threshold HGnear produce a linear map to alpha values in the range zero to one. Depth values greater than depth threshold HGfar are also mapped to zero, and depth values less than threshold HGnear are mapped to one. Note this process of generating the alpha mask directly from depth data can be used for either synthesized depth data or acquired depth data.

The above description and the accompanying drawings that illustrate aspects and embodiments of the present inventions should not be taken as limiting—the claims define the protected inventions. Various mechanical, compositional, structural, electrical, and operational changes may be made without departing from the spirit and scope of this description and the claims. In some instances, well-known circuits, structures, and techniques have not been shown or described in detail to avoid obscuring the invention.

This description's terminology is not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of the device in use or operation in addition to the position and orientation shown in the figures. For example, if the device in the figures is turned over, elements described as "below" or "beneath" other elements or features would then be "above" or "over" the other elements or features. Thus, the exemplary term "below" can encompass both positions and orientations of above and below. The device may be otherwise oriented (rotated 90 degrees or at other orientations) and the spatially relative descriptors used herein interpreted accordingly. Likewise, descriptions of movement along and around various axes include various special device positions and orientations.

The singular forms "a", "an", and "the" are intended to include the plural forms as well, unless the context indicates otherwise. The terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Memory refers to a volatile memory, a non-volatile memory, or any combination of the two. A processor is coupled to a memory containing instructions executed by the processor. This could be accomplished within a computer system, or alternatively via a connection to another computer via modems and analog lines, or digital interfaces and a digital carrier line.

Herein, a computer program product includes a medium configured to store computer readable code needed for any one or any combination of the operations described with respect to the augmented display system or in which computer readable code for any one or any combination of operations described with respect to the augmented display system is stored. Some examples of computer program products are CD-ROM discs, DVD discs, flash memory, ROM cards, floppy discs, magnetic tapes, computer hard drives, servers on a network and signals transmitted over a network representing computer readable program code. A tangible computer program product includes a tangible medium configured to store computer readable instructions for any one of, or any combination of operations described with respect to the augmented display system or in which computer readable instructions for any one of, or any combination of operations described with respect to the augmented display system are stored. Tangible computer program products are CD-ROM discs, DVD discs, flash memory, ROM cards, floppy discs, magnetic tapes, computer hard drives and other physical storage mediums.

In view of this disclosure, instructions used in any one of, or any combination of operations described with respect to the augmented display system can be implemented in a wide variety of computer system configurations using an operating system and computer programming language of interest to the user.

All examples and illustrative references are non-limiting and should not be used to limit the claims to specific implementations and embodiments described herein and their equivalents. The headings are solely for formatting and should not be used to limit the subject matter in any way, because text under one heading may cross reference or apply to text under one or more headings. Finally, in view of this disclosure, particular features described in relation to one aspect or embodiment may be applied to other disclosed aspects or embodiments of the invention, even though not specifically shown in the drawings or described in the text.

We claim:

1. A method comprising:
   receiving an acquired video image at a controller, wherein the acquired video image comprises a hand pose image of a hand gesture;
   segmenting, by the controller, the hand pose image from the acquired video image to obtain a segmented hand pose image, the segmenting comprising a depth threshold process followed directly by a flood fill process, the depth threshold process and the flood fill process each using depth data for pixels in the acquired video image, the depth threshold process processing the acquired video image to eliminate pixels having a depth greater than a maximum depth threshold from the acquired video image to obtain a first modified data frame, the flood fill process receiving the first modified data frame directly from the depth threshold process, and the flood fill processing the received first modified data frame to obtain a hand pose mask;
   combining, in real time by the controller, the segmented hand pose image with an image of a surgical site to obtain a combined image, wherein the combining comprises using an alpha mask; and
   sending the combined image from the controller to a display device.

2. The method of claim 1, wherein the acquired video image of the hand gesture comprises an instructional hand gesture associated with surgery.

3. The method of claim 2, wherein the instructional hand gesture instructs how to manipulate a slave surgical instrument in a surgical system.

4. The method of claim 1, wherein the depth data comprises acquired depth data.

5. The method of claim 1, further comprising:
   transforming, by the controller, a perspective of the segmented hand pose image prior to the combining.

6. The method of claim 5, wherein the transforming the perspective comprises:
   transforming the segmented hand pose image to achieve an apparent scale and depth consistent with a slave surgical instrument or anatomy viewed in the image of the surgical site.

7. The method of claim 1, wherein the flood fill process further comprises:
   eliminating pixels not representing the hand gesture in the first modified data frame to obtain the hand pose mask of the hand gesture, the eliminating pixels not representing the hand gesture being based at least in part on the depth data.

8. The method of claim 7, wherein the segmenting further comprises:
   extracting the hand pose image from the acquired video image by using the hand pose mask of the hand gesture.

9. The method of claim 8, wherein the combining further comprises:
   using the hand pose mask of the hand gesture as the alpha mask in the combining.

10. The method of claim 7, wherein the eliminating pixels not representing the hand gesture further comprises:
    using a color classifier to identify pixels not in the hand pose image.

11. The method of claim 7, wherein the eliminating pixels not representing the hand gesture further comprises:

using a skin color classifier to refine a boundary of the hand pose mask.

12. The method of claim 1, wherein:

the display device is included in a console;

the console comprises a master manipulator;

the segmenting the hand pose image further comprises using information characterizing the master manipulator in the segmenting; and the information is different from depth data.

13. The method of claim 12, wherein the information includes a static image of the master manipulator.

14. The method of claim 13, wherein the information includes kinematic data for a position of the master manipulator.

15. The method of claim 1, wherein the depth data comprises synthesized depth data.

16. The method of claim 1, wherein:

the display device is included in a console;

the console comprises a master manipulator; and the method further comprises:

parking the master manipulator to provide an unobstructed volume in which to make the hand gesture.

17. The method of claim 1, wherein the flood fill process further comprises:

selecting a seed pixel positioned on an edge of the first modified data frame; and performing the flood fill process starting at the selected seed pixel.

18. A surgical system comprising:

a console comprising a first viewer; and a display image controller configured to be connected to the first viewer and comprising:

a memory storing instructions; and a processor communicatively coupled to the memory and configured to execute the instructions to:

receive an image of a surgical site and receive an acquired video image, the acquired video image comprising a hand pose image of a hand gesture, segment the hand pose image from the acquired video image, the segmenting including a depth threshold process followed directly by a flood fill process, the depth threshold process and the flood fill process each using depth data for pixels in the acquired video image, the depth threshold process processing the acquired video image to eliminate pixels having a depth greater than a maximum depth threshold from the acquired video image to obtain a first modified data frame, the flood fill process receiving the first modified data frame directly from the depth threshold process, and the flood fill processing the received first modified data frame to obtain a hand pose mask, combine the segmented hand pose image with the image of the surgical site using an alpha mask to obtain a combined image, and send the combined image to the first viewer to be displayed.

19. The system of claim 18, further comprising:

a second console comprising:

a second viewer; and a depth sensing camera mounted on the second viewer, the depth sensing camera being connected to the display image controller, the depth sensing camera being configured to acquire the depth data, wherein the acquired video image is acquired at the second console.

20. The system of claim 18, further comprising:

an endoscope; and a camera coupled to the endoscope and connected to the display image controller, wherein the camera acquires the image of the surgical site.

* * * * *